Sept. 16, 1947.  W. B. KLEMPERER ET AL  2,427,463
APPARATUS FOR MAKING COMPUTATIONS ELECTRICALLY
Filed May 10, 1943  5 Sheets-Sheet 1
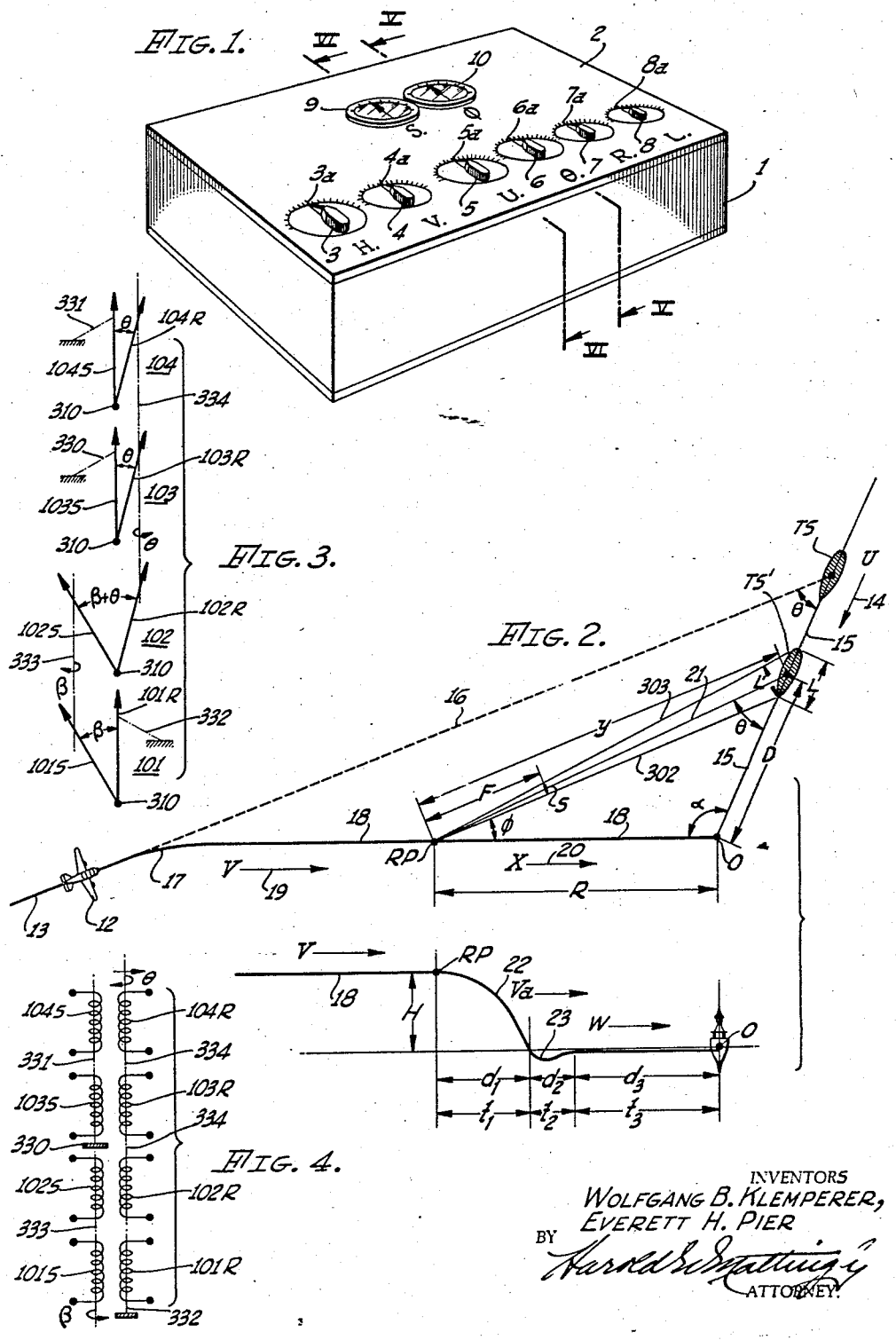
INVENTORS
WOLFGANG B. KLEMPERER,
EVERETT H. PIER
BY
ATTORNEY Sept. 16, 1947. W. B. KLEMPERER ET AL 2,427,463
APPARATUS FOR MAKING COMPUTATIONS ELECTRICALLY
Filed May 10, 1943 5 Sheets-Sheet 2

INVENTORS
WOLFGANG B. KLEMPERER,
EVERETT H. PIER,
BY
ATTORNEY.

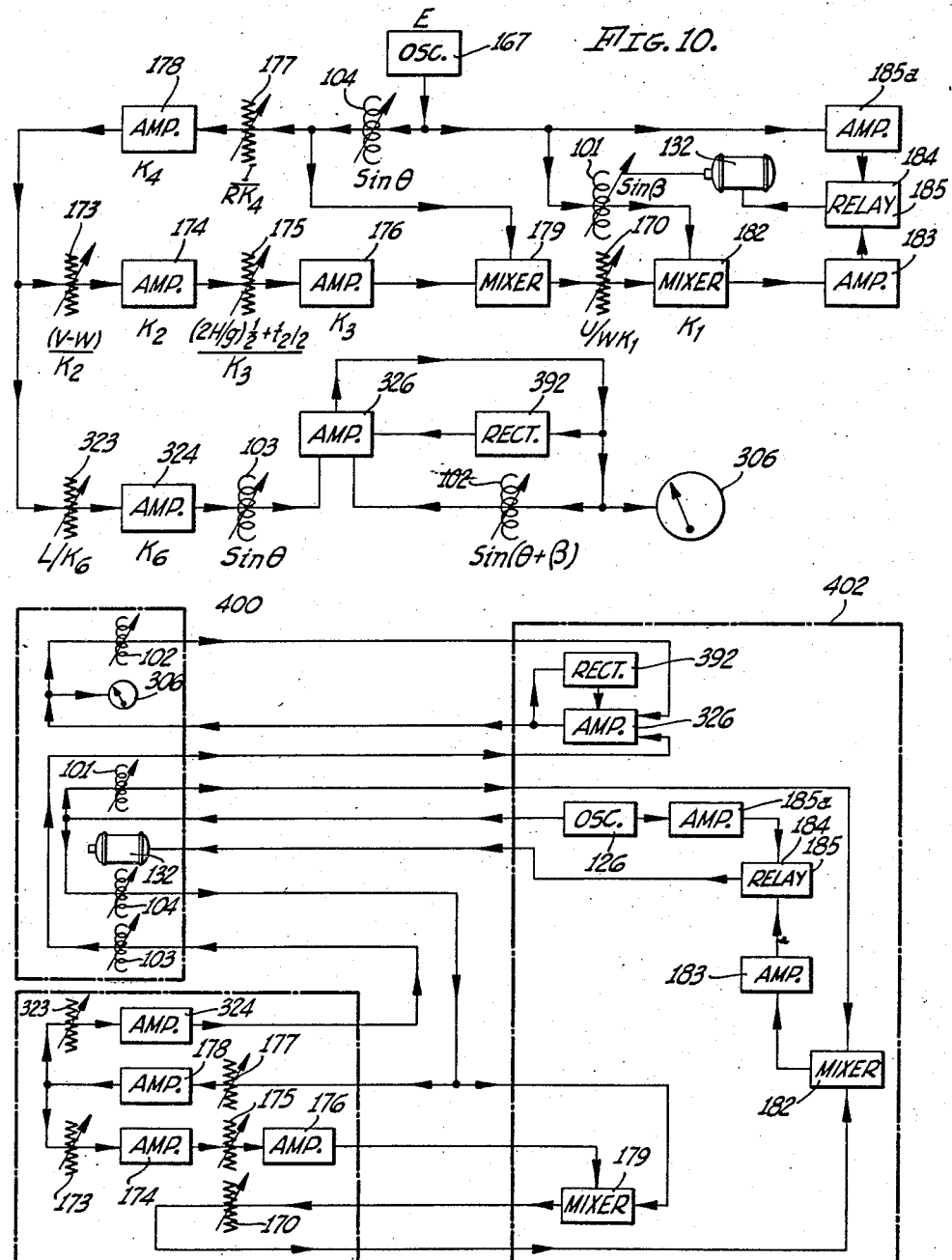

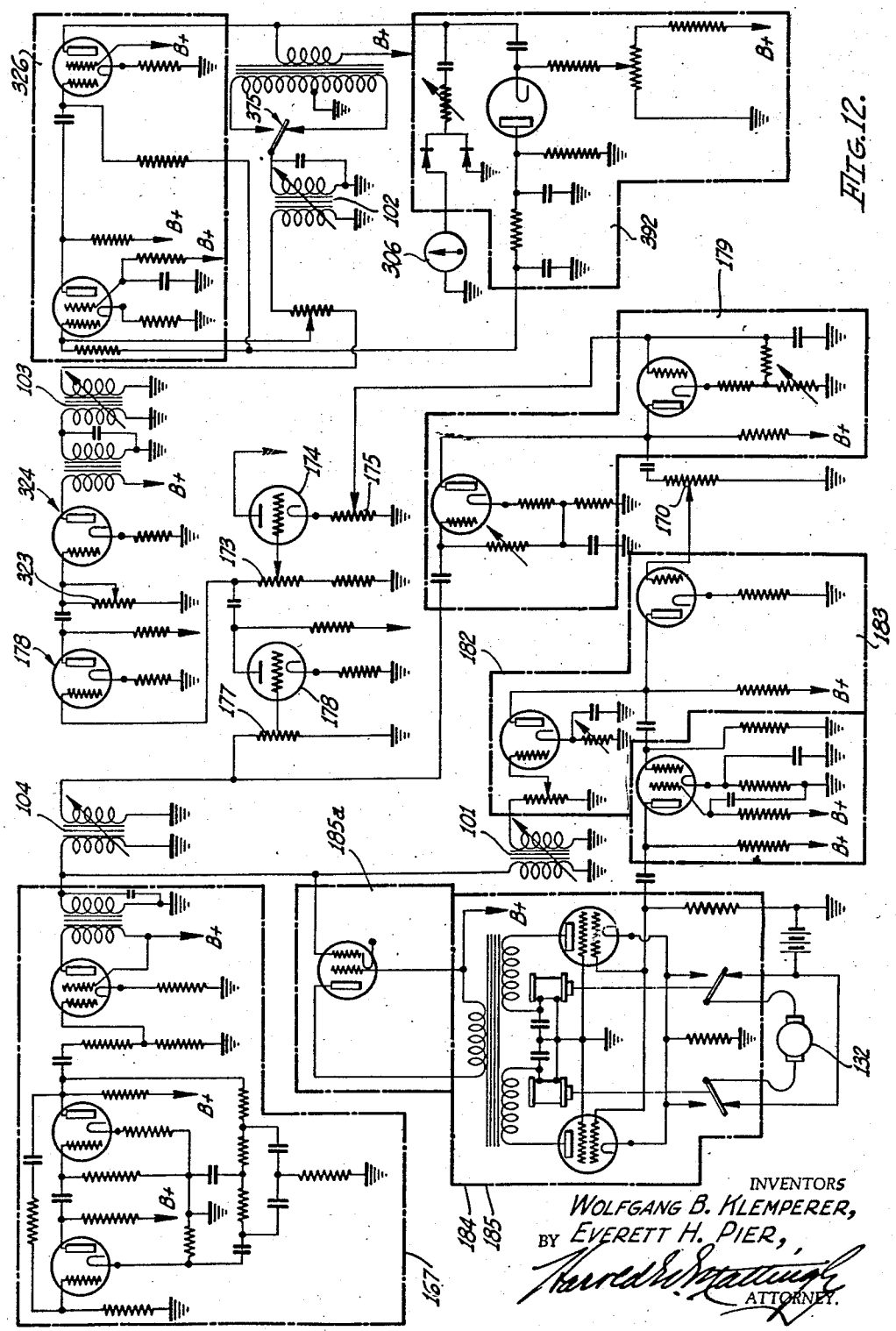

Patented Sept. 16, 1947

2,427,463

UNITED STATES PATENT OFFICE 2,427,463

APPARATUS FOR MAKING COMPUTATIONS ELECTRICALLY

Wolfgang B. Klemperer and Everett H. Pier, West Los Angeles, Calif., assignors to Douglas Aircraft Company, Inc., Santa Monica, Calif.

Application May 10, 1943, Serial No. 486,318

5 Claims. (Cl. 235—61)

1

Our invention relates to a calculating device and has particular reference to a new method and apparatus for solving algebraic and trigonometrical problems by electrical means.

In certain pursuits it is necessary to solve various algebraic or trigonometrical equations. Such a necessity is encountered with great frequency in the conduct of a war as in the sighting of guns and artillerly pieces, the launching of torpedoes and the dropping of bombs. Inasmuch as the various factors involved in the solution of problems of this character are subject to frequent changes or are continuously changed, it is imperative that the process of solving the problem proceed with the greatest speed possible in order that the result may reasonably conform to the magnitudes of the various factors involved at the time the result is given. Preferably a calculating device employed for solving such problems should operate substantially instantaneously so that there may be indicated a result which changes instantly with changes in any of the factors.

We are aware of prior attempts to provide calculating machines for solving problems of the character referred to but most of such attempts employed mechanical linkages and movements to produce displacements proportional to the various factors involved and to the result given. Such devices were by their very nature slow in operation, complicated in construction, expensive to manufacture, and likely to get out of adjustment.

We propose by the present invention to solve algebraic and trigonometrical equations of the character above referred to by electrical means. By so doing we are enabled to overcome the above noted defects in the prior devices and realize the desiderata set out hereinbefore.

It is accordingly an object of our invention to provide a calculating device in which various mathematical operations are performed rapidly.

It is an additional object of our invention to provide a calculating device in which the various quantities and factors involved in a given mathematical equation and in the solution thereof are represented by electrical quantities.

It is also an object of our invention to provide apparatus for evaluating the product of two variables wherein one variable is represented by a variable electrical potential and the other variable is represented by a variable ratio of transformation to which said electrical potential is subjected.

It is a still further object of our invention to provide apparatus for evaluating the quotient of two variables wherein one variable is represented by a variable electrical potential and the other variable is represented by a variable ratio of transformation to which said electrical potential is subjected.

It is additionally an object of our invention to provide apparatus for evaluating the product of two variable quantities wherein one variable quantity is represented by a variable electrical potential, by selecting a fractional part of said variable electrical potential proportional to the second variable quantity and then amplifying the selected fractional part of said variable voltage by an amount equal to the constant of proportionality of said proportion.

It is a still further object of our invention to provide apparatus for evaluating the quotient of two variable quantities wherein one variable quantity is represented by a variable electrical potential, by selecting a fractional part of said variable electrical potential proportional to the reciprocal of the other variable quantity and then amplifying the selected part of said variable electrical potential by an amount equal to the constant of proportionality of said proportion.

It is also an object of our invention to provide apparatus for obtaining the algebraic sum of two variable quantities wherein each variable quantity is represented by a variable electrical potential by employing a vacuum tube circuit including separate input circuits and a single output circuit, each of the variable electrical potentials being supplied to one of said input circuits, whereby the electrical potential of said output circuit is representative of the algebraic sum of said variable quantities.

It is also an object of our invention to provide apparatus for evaluating the quotient of two variable quantities wherein one variable is represented by a variable electrical potential by employing a vacuum tube amplifier of the inverse-feedback type in which the inverse-feedback constant is variable in proportion to said other variable quantity.

Other objects and advantages of our invention will be apparent from a study of the following description, read in connection with the accompanying drawings which have been selected to illustrate as a typical application of the apparatus of our invention an arrangement adapted to provide a concurrent solution of two trigonometrical equations involved in the launching of a torpedo from an aircraft in such manner that it will subsequently collide with a moving surface ship.

In the drawings:

Fig. 1 is a perspective view illustrating the general form and appearance of an electrical calculating device constructed in accordance with our invention;

Fig. 2 is a geometrical diagram illustrating the various quantities and factors involved in the solution of a torpedo launching and directing problem such as previously referred to;

Fig. 3 is a diagrammatic view illustrating the angular relationships between certain controlling elements included in the preferred form of our invention;

Fig. 4 is a diagrammatic view further illustrating the cooperative relation between the parts of the device represented diagrammatically in Fig. 3;

Figure 8:
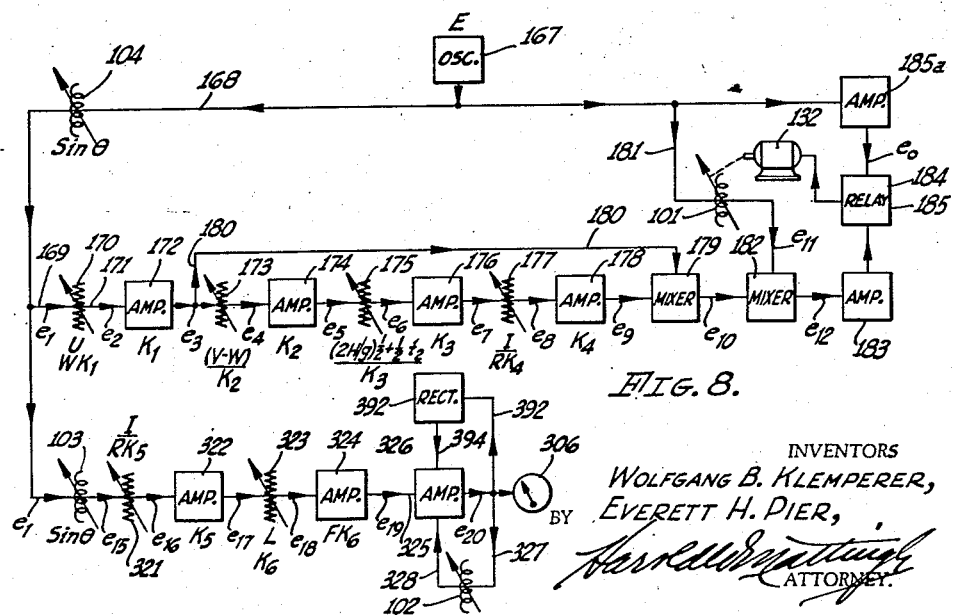
Figure 9:
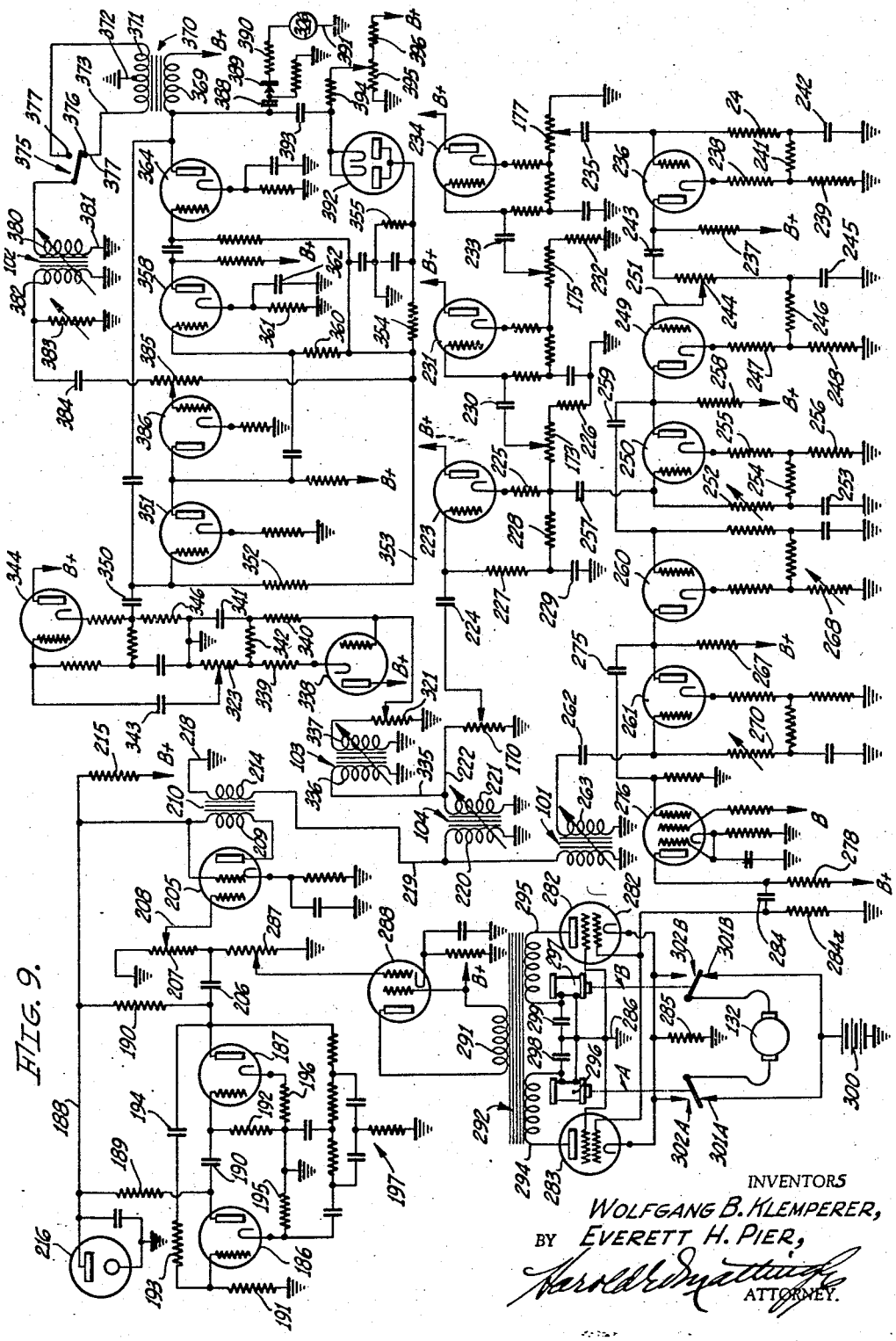

Fig. 8 is a "block" diagram illustrating schematically the mode of interconnection of various parts of the electrical calculating device of our invention and indicating the function performed by each, Fig. 8 illustrating that portion of the calculating device which determines and indicates the angular amount by which a moving target must be led in order to insure that a projectile will collide with the same, and illustrating also that portion of the electrical calculating device of our invention which determines and indicates the range of the target;

Fig. 9 is a complete schematic wiring diagram illustrating the electrical apparatus and connections employed in the calculating device of our invention;

Fig. 10 is a "block" diagram illustrating an alternative arrangement of the various parts of the electrical calculating device;

Fig. 11 is a "block" diagram similar to Fig. 10 but showing the manner in which the various parts of the apparatus may be collected and grouped in separate locations and certain specific applications of the calculator; and Fig. 12 is a complete schematic wiring diagram illustrating the electrical apparatus and the connections employed in the alternative arrangement which is shown in Figs. 10 and 11.

General description

Referring to the drawings, we have illustrated the preferred embodiment of our invention as comprising a casing or housing 1 which includes an upper cover member or panel 2. Upon the panel 2 is mounted a plurality of manually adjustable members identified by the reference characters 3 through 8 which are arranged as pointers movable over associated dials identified by reference characters 3a through 8a, it being intended that the members 3 through 8 be manually set to positions indicating on their respective dials the magnitude of various quantities involved in the equations which the calculating device is arranged to solve.

The panel 2 also supports a pair of indicating devices 9 and 10 which operate to continuously indicate the result or solution of these two equations.

Calculation of torpedo course

As hereinbefore noted, the calculating device which we have selected for illustrating the method and apparatus of our invention is arranged to solve the two equations defining the problem of so launching a torpedo from a moving aircraft as to cause that torpedo to strike a moving surface ship. We have illustrated in Fig. 2 the various geometrical and trigonometrical relations upon which the solution of the above mentioned problem depends.

It will be noted that Fig. 2 is drawn in two parts, the upper part comprising a plan view while the lower part comprises an elevational view illustrating the path of the torpedo after it is dropped from the aircraft. This figure is an approximate representation of the conditions and relationships existing just prior to the launching of a torpedo in that it shows as straight lines certain portions of the flight path of an aircraft which are in practice usually curved. However, as is explained in detail hereinafter, the simplification effected by treating these curved paths as straight lines introduces an error which is so small as to have a negligible effect upon the result obtained.

In Fig. 2 it is assumed that an aircraft 12 is proceeding along a course indicated by the line 13 at the time a target vessel TS is sighted. The vessel TS is assumed to be travelling in the direction indicated by the arrow 14 along a course indicated by the line 15 and at a velocity U.

It is assumed that by the time the aircraft 12 has reached the point illustrated in Fig. 2, the pilot has determined that the target TS is an enemy ship and that he will launch a torpedo at the same. Accordingly a sight is taken as illustrated by the dotted line 16 and the angle between the sighting line 16 and the target course 15 is determined. This angle is indicated in Fig. 2 as the angle $\theta$ and hereinafter referred to as the target approach angle. Thereafter the calculating device is employed to compute the lead angle which will be hereinafter referred to as $\phi$. When this angle is determined, the sighting device carried by the aircraft 12 is turned astern of the target through the angle $\phi$ and the course of the aircraft 12 is then altered as indicated by the curve 17 in Fig. 2 to swing the course of the plane 12 ahead of the target through an angle sufficient to again bring the sighting line to bear upon the target TS.

The new course of the aircraft 12 is indicated by the line 18 in Fig. 2. The aircraft is, at the time of torpedo launching, assumed to be travelling in the direction indicated by the arrow 19 along the course 18 and at a velocity V. When the aircraft reaches the release point RP, the torpedo is launched, the release point RP being situated a distance R (hereinafter termed "the torpedo travel range") from the point O where the intended collision between the torpedo and the target vessel TS will take place. At the time the torpedo is launched, the target ship TS occupies the position illustrated in Fig. 2 by the ship outline bearing the reference character TS'. After being launched the torpedo proceeds in the direction of the course 18 as indicated by the arrow 20 in Fig. 2 with a velocity of varying magnitude which may be represented by an average velocity X.

At the instant of torpedo launching there exists a sighting or interception triangle comprising the intended torpedo course 18 extending from the release point RP to the collision O, this side of the triangle having a length equal to the torpedo travel range R; a sighting line 21 extended from the release point RP to the bow of the target ship TS when in the position illustrated by the outline TS', the sighting line being disposed at the lead angle $\phi$ relative to the course of the plane 12 and the course of the torpedo and having a length equal to the sighting range Y. The third side of the triangle comprises the extension of the target ship course 15 extending from the ship location TS' a distance D to the collision point O and making the angle $\theta$ with the sighting line 21. The third angle of the triangle is the striking angle or angle of intersection of the target course 15 with the torpedo course 18 and is represented as the angle $\alpha$ in Fig. 2.

Reference to the lower half of Fig. 2 will indicate the vertical projection of the path of the torpedo after launching. In this portion of Fig. 2 it is assumed that prior to the arrival of the aircraft 12 at the release point RP the aircraft is flying along the course 18 with a velocity V and at a constant altitude H. When the aircraft arrives at the release point RP the torpedo is released and so falls by gravity to the surface of the water. In so falling the torpedo pursues a substantially parabolic trajectory such as is indicated by the curved line 22. The principal dimensions of this parabolic trajectory comprise the altitude H at the origin of the curve and the horizontal distance $d_1$ through which the torpedo travels due to its initial forward velocity V during the time of fall from the altitude H to the surface of the water. Upon striking the water the torpedo submerges to a certain depth and then rises to the normal propulsion depth for which the torpedo was set, this part of the torpedo path being indicated by the double curved line 23 in Fig. 2. The speed of the torpedo during this part of its travel will, for convenience, be represented by the term $V_a$.

After the torpedo has traversed the distance $d_2$ it will have decelerated to its normal propulsion velocity, to which velocity W is assigned. The remainder of the torpedo travel until the collision point O is reached covers a distance $d_3$.

For convenience in calculation we have employed the symbols $t_1$, $t_2$ and $t_3$ to indicate the respective times required for the torpedo to traverse the distances $d_1$, $d_2$ and $d_3$.

If it were not for the fact that the torpedo traverses the first part ($d_1$) of its path in air at essentially the same forward speed as the air speed (V) of the aircraft and the last part of its path ($d_3$) in water at the much lower propulsion velocity (W) of the torpedo, and if it were not for the fact that the time ($t_1$) required for the first part ($d_1$) of the path does not depend on the torpedo travel range (R), whereas the time ($t_3$) required for the last part ($d_3$) of the path does, the shape of the interception triangle (RP, O, TS') would not be affected by the torpedo travel range (R) and it would not matter at what range the torpedo was launched provided the correct value of the lead angle ($\phi$) was used. However, because of the difference in times and velocities just noted, the range, once chosen, does have a corrective influence upon the proper lead angle. It is, therefore, necessary to choose a suitable torpedo travel range and then evaluate the lead angle which is associated with the selected range. The choice of the torpedo travel range is ordinarily made by the pilot of the aircraft after appraisal of the tactical situation. It is, therefore, assumed for the purpose of this analysis that the pilot of the aircraft 12 arbitrarily selects the torpedo travel range R at which the torpedoing operation will be performed.

It is further assumed that at the time the pilot of the aircraft 12 decides to attempt to torpedo the target ship TS the velocity V of the aircraft and its altitude H are known. It is also assumed that the normal propulsion velocity W of the torpedo is known, that the deceleration time $t_2$ of the torpedo has been previously determined, and that the pilot of the aircraft 12 having observed the target ship TS is able to recognize the nationality and type of ship and from the manner in which it is travelling through the water is able to determine from data previously compiled the probable value of the velocity U of the target ship TS.

Having determined these various factors, the pilot sets the angle $\theta$ on the calculating device of our invention and effects an automatic calculation of the lead angle $\phi$. The basis for this calculation may be readily understood from the following analysis.

It is obvious that in order to effect the desired collision between the torpedo and the target ship TS the time which is required for the target ship to travel from the position TS' to the collision point O must necessarily equal the time required for the torpedo to travel from the release point RP to the collision point O. Using the symbol T to represent this time, it may be said that $$T = D/U = R/X \qquad (1)$$

From this it may be said $$D/R = U/X \qquad (2)$$

From the law of sines, it may be noted that $$D/R = \sin \phi / \sin \theta \qquad (3)$$

and, therefore, $$\sin \phi / \sin \theta = U/X \qquad (4)$$

and $$\sin \phi = \frac{U \sin \theta}{X} \qquad (5)$$

Since U and $\theta$ are both known, it is further necessary to determine X in order to permit the calculation of the angle $\phi$. X, it will be recalled, is the average velocity of the torpedo in traversing the torpedo travel range R from the release point RP to the collision point O. Thus $$X = R/T \qquad (6)$$

This may be written $$X = \frac{d_1 + d_2 + d_3}{t_1 + t_2 + t_3} \qquad (7)$$

since the sum of the distances $d_1$, $d_2$ and $d_3$ equals the distance D, and the sum of the times $t_1$, $t_2$ and $t_3$ equals the total time T.

The time $t_1$ is the time required for the torpedo to fall from the altitude H to the surface of the water. According to the law of free fall this is $$t_1 = (2H/g)^{1/2} \qquad (8)$$

where $g$ is the acceleration of gravity. The distance $d_1$ may be expressed in terms of the forward component of velocity of the torpedo and the time $t_1$ as $$d_1 = Vt_1 = V(2H/g)^{1/2} \qquad (9)$$

In the preceding equation, the forward component of velocity of the torpedo has been taken as equal to the velocity V of the aircraft. This is sufficiently accurate for all purposes when there is no wind. However, if there is a wind, the term V must be used to express the ground speed of the aircraft rather than its air speed. If the wind drift triangle is known or is determined in flight in a conventional manner, an appropriate correction for head or tail wind component may be effected by an appropriate addition to or subtraction from the observed air speed of the aircraft.

The transverse component or cross wind can perhaps best be compensated for by so side slipping the aircraft into the wind as to assure yawless entry of the torpedo into the water, although other corrective measures may be adopted as desired.

The velocity $V_a$ which has been assigned to the torpedo during the time $t_2$ may, inasmuch as this time $t_2$ is thereby defined, be taken as an average of the initial and terminal torpedo velocities. In other words $$V_a = \tfrac{1}{2}(V+W) \qquad (10)$$

The distance $d_2$ may be expressed in terms of the average velocity $V_a$ and $t_2$ (which is assumed to be known from experiment) thus:

$$d_2 = V_a\, t_2 = \tfrac{1}{2}(V+W)t_2 \qquad (11)$$

The remaining terms $t_3$ and $d_3$ may be expressed in terms of the propulsion velocity $W$ and the range $R$ and the remaining distances $d_1$ and $d_2$.

Substituting the above indicated values of $d_1$, $d_2$, $d_3$, $t_1$, $t_2$ and $t_3$ in Equation 7 gives $$X = \frac{WR}{R-(V-W)[(2H/g)^{\frac{1}{2}}+\tfrac{1}{2}t_2]} \qquad (12)$$

Substituting this expression for $X$ in Equation 5, supra, gives for the determination of $\phi$ the following expression $$\sin\phi = (U/W)\left[1 - \frac{(V-W)[(2H/g)^{\frac{1}{2}}+\tfrac{1}{2}t_2]}{R}\right]\sin\theta \qquad (13)$$

The foregoing derivation is given as an example of one sighting problem involving the enumerated variables. Other problems involving different factors or the taking into account of additional variable factors will, of course, change the equation derived. It will be realized, however, that in such event the principles and the fundamental relationships are similar to those described.

From the foregoing it is apparent that the determination of the angle $\phi$ depends upon determining and properly correlating the velocities $U$, $V$ and $W$, the distances $H$ and $R$, the time $t_2$ and the angle $\theta$. The manner in which these various factors are correlated will become apparent as the description of the device proceeds.

*The computer mechanism*

Figure 5:
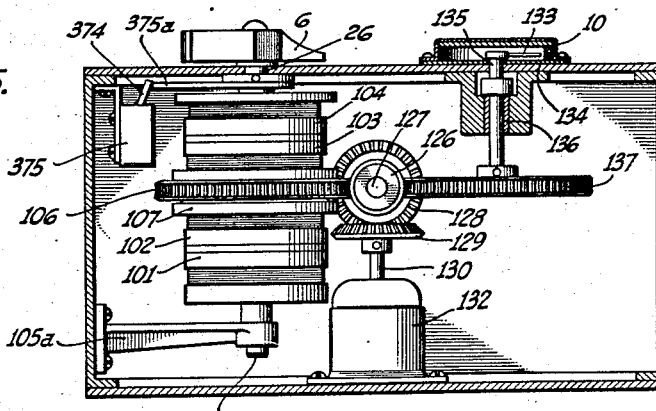
Fig. 5 is a cross sectional view taken substantially along the line V—V of Fig. 1.
Figure 6:
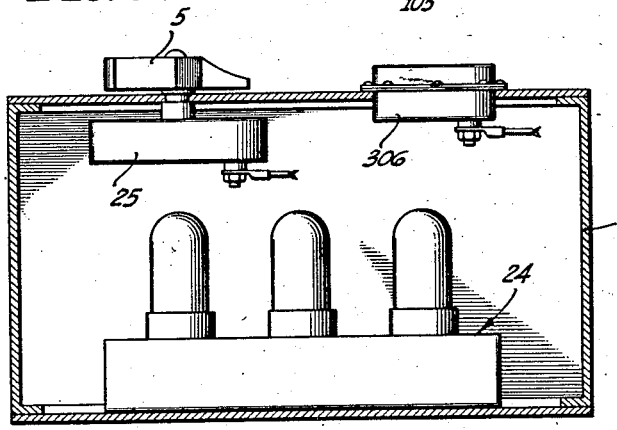
Fig. 6 is a cross sectional view taken substantially along the line VI—VI of Fig. 1.

Referring now to Figs. 5 and 6, it will be seen that the housing 1 encloses and supports a subbase structure indicated generally at 24 and is used to support various vacuum tubes and other electrical instrumentalities embodied in the calculating device. As is shown in Fig. 6, the manually adjustable members 3 through 5, 7 and 8 each comprise control knobs secured to the shaft portions of electrical potentiometers 25 of conventional construction. The remaining control knob 6 is secured to an upwardly extending shaft 26 which rises from an assembled group of rotary transformers comprising rotary transformers 101, 102, 103 and 104. These transformers each comprise an output winding which may comprise a stator structure as illustrated and an input winding which may comprise a rotor structure rotatably mounted as illustrated within the associated stator winding and so arranged that the transformation ratio between the output and input windings of the transformer is directly proportional to the sine of the angular displacement of the rotor of the transformer relative to a preselected fixed point on the stator winding. If desired, the output winding may comprise the rotor structure and the input winding may comprise the stator structure instead of vice versa.

Each of the stators of the transformers 103 and 104 is fixed relative to the housing 1 while the rotors of the transformers 103 and 104 as well as the rotor of the transformer 102 are secured to each other and secured to the shaft 26 so that the angular position of these rotors relative to the stators of the transformers 103 and 104 may be adjusted by adjustment of the knob 6.

The rotor of the transformer 101 is secured to a shaft 105 which is in turn held against rotation as by being fixed in the bracket 105a secured to the housing 1. The stators of the transformers 101 and 102 are interconnected with each other and secured to a worm wheel 106, the worm wheel 106 and stators of the transformers 101 and 102 being supported for rotation relative to the fixed stators of the transformers 103 and 104 as by means of a suitable bearing construction 107.

The worm wheel 106 meshes with a worm gear 126 which is mounted upon a horizontally extending countershaft 127 journaled for rotation as by means of suitable bearings (not shown). The shaft 127 carries a bevel gear 128 which meshes with a corresponding bevel gear 129 secured to an upwardly extending shaft 130 of a reversible electric motor 132 so that forward and reverse rotation of the motor 132 will result in clockwise or counter-clockwise movement of the stators of the transformers 101 and 102 relative to the fixed rotor of the transformer 101.

The extent of this movement is preferably indicated by the indicating device 10 which, as is shown in Fig. 5, comprises an indicating member or hand 133 positioned above a suitably calibrated dial 134 and adapted to be moved thereover as by being secured to a vertically rising shaft 135 which is journaled as indicated at 136 in a suitable bearing bracket and which supports at its lower end a worm wheel 137 identical to the worm wheel 106 previously mentioned and likewise engaged with the worm gear 126. By this means angular movements of the stators of the transformers 101 and 102 are faithfully reproduced by corresponding angular movements of the pointer 133 relative to the dial 134.

The angular relation between the hand 133 and the dial 134 is used to indicate the magnitude and sign of the lead angle $\phi$ as calculated from Equation 13, supra.

*The electrical calculation of $\phi$*

The manner in which the above described result of causing the position of the hand 133 to indicate the computed value of $\phi$ is achieved may be understood by having reference to Figs. 8 and 9 of which Fig. 9 comprises a complete schematic wiring diagram of the entire calculator while Fig. 8 comprises a "block" diagram illustrating the mode of operation of the calculator shown in Fig. 9.

In Fig. 8 each of the rectangles is intended to represent an electronic or vacuum tube unit such as an oscillator, a mixer stage, an amplifier stage or the like. The "variable resistance" symbol has been employed to represent the potentiometers 25 and the "variable inductance" symbol has been employed to represent the variable ratio transformers 101—105. The lines with the arrowheads affixed thereto and extending between the various parts of the apparatus indicate the course of an electrical signal through those various parts. The various legends inscribed near each part of the apparatus indicate the mathematical function performed by that portion of the apparatus and the matter inscribed in the rectangles is intended to represent the character of the electronic equipment designated by the associated rectangle.

As clearly appears from Fig. 8 the calculating device includes first a source 167 of alternating potential of constant voltage and frequency. We prefer to employ for this a vacuum tube oscillator normally operating to generate an alternating potential having a frequency of the order of magnitude of one thousand cycles, although other well known types of alternating potential generators may be used as desired. The voltage generated by the source 167 is applied as indicated at 168 to the input of the rotary transformer 104. Since the transformation ratio of this transformer is directly proportional to the sine of the angular displacement of the movable winding, the voltage output of the transformer 104 is likewise proportional to the sine of the angle through which the rotor of the transformer is turned.

Thus, if we assume a maximum transformation ratio of one to one and assume that the source 167 generates a voltage E, then the output of the transformer 104 will be $$e_1 = E \sin \theta \qquad (14)$$

This output is fed as indicated at 169 to a potentiometer 170 to which the control knob 5 is attached. The associated dial 5a is so calibrated that with the voltage $e_1$ applied across the entire resistance strip, the voltage between the movable contact and one end of the resistance strip will be $$e_2 = e_1 U/WK_1 \qquad (15)$$

where U is the velocity of the target ship, W is the normal propulsion velocity of the torpedo and $K_1$ is the calibration constant of the potentiometer 170. Thus the voltage between the movable contact and one end of the resistance strip of the potentiometer 170 is $$e_2 = E(U/WK_1) \sin \theta \qquad (16)$$

This voltage is fed as indicated at 171 to an amplifier stage 172 which may be adjusted to provide an overall gain equal to $K_1$ and which will, for the purpose of this description, be assumed that it is so adjusted. However, as will more fully appear hereinafter, a gain equal to $K_1$ may be obtained in any one or all of a number of the amplifier stages employed, but an understanding of the operation of the device is facilitated by considering the entire gain of $K_1$ to be obtained in the one amplifier stage 172. The same considerations also apply to the gain of the various other amplifier stages to be referred to hereinafter. Thus the output of the amplifier 172 is $$e_3 = E(U/W) \sin \theta \qquad (17)$$

The voltage $e_3$ is fed to a potentiometer 173 to which the manual control knob 4 is attached. The dial 4a of this potentiometer is calibrated in terms of V, the velocity of the aircraft and the calibration is so arranged that the voltage output of the potentiometer 173 is $$e_4 = e_3(V-W)K_2 \qquad (18)$$

This voltage is applied to an amplifier stage 174 whose overall gain is equal to $K_2$. Thus the output of the amplifier 174 is $$e_5 = E(U/W)(V-W) \sin \theta \qquad (19)$$

The voltage $e_5$ is fed to a potentiometer 175 to which the control knob 3 is attached. The dial 3a is calibrated in terms of H, the altitude of the aircraft. This calibration is so arranged that the voltage output of the potentiometer 175 is $$e_6 = e_5 \frac{(2H/g)^{\frac{1}{2}} + \frac{1}{2}t_2}{K_3} \qquad (20)$$

In this expression g is the acceleration of gravity and $t_2$ is the deceleration time of the torpedo measured from the time it strikes the water until it slows down to its normal propulsion W, the time $t_2$ being determined empirically.

The voltage $e_6$ is fed to an amplifier 176 having an overall gain equal to $K_3$ so that the voltage output of the amplifier stage 176 is $$e_7 = E(U/W)(V-W)[(2H/g)^{1/2} + \frac{1}{2}t_2] \sin \theta \qquad (21)$$

The voltage $e_7$ is fed to a potentiometer 177 to which the control knob 7 is attached. The dial 7a of this potentiometer is calibrated in terms of R, the intended torpedoing range. This calibration is so arranged that the voltage output of the potentiometer 177 is $$e_8 = e_7/RK_4 \qquad (22)$$

The voltage $e_8$ is fed to an amplifier stage 178, the overall gain of which is adjusted to be equal to $K_4$. Thus the voltage output of the amplifier 178 is $$e_9 = E(U/W)(V-W)\left[\frac{(2H/g)^{\frac{1}{2}} + \frac{1}{2}t_2}{R}\right] \sin \theta \qquad (23)$$

The voltage $e_9$ is fed to a mixer stage 179 as is also the voltage $e_3$ as is indicated at 180. The outputs of the amplifiers 172 and 173 are so adjusted with respect to the time phase of their respective output voltages that the mixer 179 effects a subtraction of the voltage $e_9$ from the voltage $e_3$. Thus the voltage output of the mixer 179 is $$e_{10} = E(U/W) \sin \theta - E(U/W)(V-W)\frac{(2H/g)^{\frac{1}{2}} + \frac{1}{2}t_2}{R} \sin \theta \qquad (24)$$

This expression may be rewritten as $$e_{10} = E(U/W)\left[1 - \frac{(V-W)[(2H/g)^{\frac{1}{2}} + \frac{1}{2}t_2]}{R}\right] \sin \theta \qquad (25)$$

Comparing this with Equation 13 (see page 16), supra, it will be noted that $$e_{10} = E \sin \theta \qquad (26)$$

It should at this point be noted that among other things the potentiometer 170 operated to introduce the factor $(1/K_1)$ into the expression for $e_3$. This was assumed to be cancelled out by introducing the factor $(K_1)$ into the expression by making the gain of the amplifier stage 172 equal to $K_1$. It will be apparent that if desired, the same result may be obtained by making the product of the gains of the amplifier 172 and that input channel of the mixer stage 179 which is associated with the potential $e_3$ equal to $K_1$. Thus if desired the entire gain of $K_1$ may be had at the mixer stage 179 if desired.

Similarly, there has been introduced into the expression for $e_9$ the factors $(1/K_1)$, $(1/K_2)$, $(1/K_3)$ and $(1/K_4)$. The effect of these factors may be cancelled by making the product of the gains of the amplifier stages 172, 174, 176, 178 and that input channel of the mixer stage 179 which is associated with the potential $e_9$ equal to $(K_1 K_2 K_3 K_4)$, thus permitting wide choice as to the gains of the individual stages.

The output of the source 167 is also conducted as indicated at 181 to the input of the rotary transformer 101. It will be recalled that the rotor of this transformer is fixed with respect to the housing 1 and that the angular position of the stator of the transformer 101 corresponds precisely to the angular position of the hand 133 relative to the dial 134. This, the actual angular movement of the hand 133 will be referred to as the angle $\beta$. Thus, if the voltage input to the transformer 101 is equal to E, the output voltage is $$e_{11} + E \sin \beta \tag{27}$$

The voltages $e_{10}$ and $e_{11}$ are each fed to a mixer 182 and the phase relation of the voltages $e_{10}$ and $e_{11}$ is so adjusted that the mixer effects a subtraction of these two. By this the voltage output of the mixer 182 is made $$e_{12} = E(\sin \phi - \sin \beta) \tag{28}$$

The voltage output $e_{12}$ is amplified by a power amplifier 183 and applied to a phase selector 184 and polarized relay 185. Referring to Equation 28, supra, it will be observed that if the angle $\beta$ is smaller than the angle $\phi$, the potential $e_{12}$ will be expressed with a plus sign, whereas if the angle $\beta$ is increased sufficiently to exceed the angle $\phi$, the sign of $e_{12}$ will change from plus to minus. Because $e_{12}$ is the magnitude of an alternating potential, the plus and minus signs just referred to are meaningless as regards polarity of the potential except at a given instant. Thus, in reality, a change in sign from plus to minus (or vice versa) of the voltage $e_{12}$, signifies a complete 180° reversal in the time phase of the voltage.

The phase selector 184 is arranged to be responsive to reversals of phase of the voltage $e_{12}$ as by comparing the time phase of the voltage $e_{12}$ with the time phase of a constant voltage $e_0$ derived from the source 167 and amplified as by an amplifier 185a.

The phase selector 184 is arranged to control the polarized relay 185 to operate the same in one direction when $e_{12}$ partakes of a plus sign and in an opposite direction when the sign of $e_{12}$ goes minus. The relay 185 is in turn connected to control the motor 132 in such manner as to rotate the motor 132 in one direction when sin $\phi$ exceeds sin $\beta$ and in the other direction when sin $\beta$ exceeds sin $\phi$. The directions of rotation of the motor 132 are so chosen that when energized the motor tends to rotate the stator of the transformer 101 in such direction as to bring E sin $\beta$ toward equality with E sin $\phi$. Thus the motor 132 will operate automatically to turn the hand 133 to a position such that the angle $\beta$ through which it has been rotated is equal to the angle $\phi$ as determined by the electrical calculator and the position of the hand 133 relative to the dial 134 indicates directly the calculated value of the angle $\phi$.

Referring now particularly to Fig. 9, we have illustrated therein the electrical connections involved in the calculating mechanism which has just been described in connection with the diagrammatic arrangement of Fig. 8. In Fig. 9 the electrical circuits employed for supplying power to the heaters of the various thermionic tubes employed have been omitted since these circuits are all conventional. In a similar manner the conventional connections for supplying the high voltage direct plate potential to the anodes of the thermionic tubes have been omitted, connections to a suitable plate potential supply being indicated diagrammatically by an arrow bearing the legend B+.

In Fig. 9 the source 167 of alternating potential is illustrated as comprising a vacuum tube oscillator including vacuum tubes 186 and 187. The oscillator 167 comprises a conventional degeneratively coupled oscillator in which the plates of the tubes 186 and 187 are respectively connected to a plate supply bus 188 through plate load resistances 189 and 190. The grids of the tubes are held at a fixed direct potential relative to ground by means of grid resistances 191 and 192. The exciting voltage for the tube 186 is obtained by coupling the grid thereof to the plate of the tube 187 through a feed-back circuit including a resistance 193 and a condenser 194.

Grid bias for the tubes 186 and 187 is obtained by connecting their respective cathodes to ground through cathode resistances 195 and 196. A degenerative coupling of the cathode of the tube 186 to the plate of the tube 187 is provided by means of a conventional filter circuit indicated generally at 197. This circuit is so arranged that the minimum degenerative effect is obtained at a frequency determined by the values of resistance and capacity of the various elements of the filter circuit. Preferably the filter is adjusted to provide the minimum degenerative effect at a frequency in the order of one thousand cycles. Since the minimum degenerative effect is obtained at this frequency, the vacuum tubes 186 and 187 will be excited at that frequency and there will be produced across the plate load resistance 190 an alternating potential having a frequency equal to that corresponding to the minimum conductance of the filter 197.

The plate of the tube 187 is connected to the grid of an amplifier tube 205 through a coupling condenser 206. The grid side of the coupling condenser 206 is preferably connected to ground through a potentiometer 207, the movable contact member of which is connected as by a conductor 208 to the grid of the tube 205 so that the voltage input to the tube 205 may be adjusted as desired by adjustment of the potentiometer 207.

The amplifier stage employing the tube 205 may be of conventional construction and is illustrated in Fig. 9 as comprising a pentode amplifier in which the plate of the tube 205 is connected to one terminal of a primary winding 209 of a plate coupling transformer 210, the other terminal of the winding 209 being connected to the plate supply bus 188.

In order that the voltage output developed across a secondary winding 214 of the transformer 210 may be maintained as constant as possible, the plate supply bus 188 is connected to the source of plate potential through a series resistance 215 and a voltage regulator tube 216 is connected between the plate supply bus 188 and ground.

The secondary winding 214 of the plate coupling transformer 210 preferably has one terminal grounded as at 218 and the other terminal connected as by means of a conductor 219 to one terminal of the input winding 220 of the rotary transformer 104, the other terminal of the winding 220 being connected to ground. The movable output winding of the transformer 104 is identified by reference character 221. One terminal of the winding 221 is grounded and the other terminal is connected by means of a conductor 222 to one end of the resistance strip of the potentiometer 170. Thus if the voltage applied to the conductor 219 is E, then the voltage applied to conductor 222 and across the resistance strip of potentiometer 170 is $E \sin \theta$.

The movable arm portion of the potentiometer 170 is connected through a coupling condenser 224 to the grid of a vacuum tube 223 comprising the amplifying stage 172 referred to in connection with Fig. 8. The potentiometer 170, it will be recalled, is calibrated in terms of U. Thus the factor U is introduced into the voltage which is applied to the grid of the amplifier tube 223. The plate of the tube 223 is connected directly to the source of plate supply potential and the cathode of the tube is connected to ground by means of a cathode circuit including a cathode bias resistor 225, the resistance strip portion of the potentiometer 173 and a fixed resistance 226.

The potentiometer resistance 173 and the fixed resistance 226 constitute the plate load for the tube 223. The grid of the tube 223 is connected to the cathode circuit through a grid resistance 227 and an isolating resistance 228, the latter being connected to the cathode circuit at a point between the resistances 225 and the potentiometer 173. The midpoint between resistances 227 and 228 is preferably connected to ground through a by-pass condenser 229.

If desired, the circuits for the tube 223 may be so arranged as to give an overall amplification of the tube 223 equal to $K_1$ so that the constant $K_1$ introduced into the voltage applied to the grid of the tube 223 by the potentiometer 170 may be exactly neutralized. The circuits shown, however, will ordinarily provide a gain somewhat lower than that which would be required to exactly equal $K_1$. As previously pointed out, it is intended that this deficiency in the overall gain of the amplifier stage 172 be made up by incorporating into the mixer stage 179 a sufficient gain to offset the deficiency in gain of the amplifier stage 172 as well as that of the amplifier stages 174, 176 and 178 to be hereinafter described in detail.

The movable contact member of potentiometer 173 is connected through a coupling condenser 230 to the grid of a vacuum tube 231 comprising the amplifier stage 174 referred to in connection with Fig. 8. The potentiometer 173, it will be recalled, is calibrated in terms of V. Consequently the factor V is introduced into the voltage which is applied to the grid of the tube 231.

The tube 231 is connected in a manner identical to the connections associated with the tube 223, the plate load for the tube 231 comprising the potentiometer 175 and a fixed resistance 232 connected in series in the cathode circuit.

The movable arm portion of the potentiometer 175 is connected through a coupling condenser 233 to the grid of a vacuum tube 234 comprising the amplifier stage 176 referred to in connection with Fig. 8. It will be recalled that the dial of the potentiometer 175 is calibrated in terms of H. Consequently the factor H is introduced into the voltage which is applied to the grid of the tube 234.

The vacuum tube 234 is connected in circuits similar to the circuits employed for the tubes 223 and 231, the plate load for the tube 234 comprising the resistance strip portion of the potentiometer 177.

The movable arm portion of the potentiometer 177 is connected through a coupling condenser 235 to the grid of a vacuum tube 236 comprising the amplifier 178 referred to in connection with Fig. 8. The dial of the potentiometer 177 is calibrated in terms of R. Consequently the factor R is introduced into the voltage which is applied to the grid of the tube 236.

The plate of the tube 236 is connected to the source of plate potential through a plate load resistance 237 while the cathode of the tube is connected to ground through a cathode bias resistor 238 and a fixed resistance 239. The grid of the tube 236 is in turn connected through a grid resistance 240 and a coupling resistance 241 to the common connection between resistances 238 and 239. Likewise the point of common connection between the resistances 240 and 241 is preferably connected to ground through a condenser 242.

The plate of the tube 236 is preferably connected through a coupling condenser 243 to one end of the resistance strip portion of a potentiometer 244. The other end of the potentiometer 244 is connected to ground through a condenser 245 and is likewise connected through a resistance 246 to the point of common connection of two series connected resistances 247 and 248 comprising the cathode circuit of a vacuum tube 249.

The vacuum tube 249 and an associated vacuum tube 250 comprise the mixer stage 179 referred to in connection with Fig. 8. The grid of the tube 249 is connected as by means of conductor 251 to the movable arm portion of the potentiometer 244. The grid of the vacuum tube 250 is connected to ground through a variable resistance 252 and a condenser 253 and is likewise connected through a resistance 254 to the point of common connection between series connected resistances 255 and 256 comprising the cathode circuit for the tube 250.

The grid of the tube 250 is likewise coupled through a coupling condenser 257 to the point of common connection between the cathode resistance 225 and the potentiometer 173 associated with the vacuum tube 223. Thus the grid circuit of the tube 249 comprises one input channel of the mixer stage 179, whereas the grid circuit of the tube 250 comprises the second input channel for this mixer.

The plates of the tubes 249 and 250 are connected to each other and are connected to the source of plate potential through a plate load resistance 258 and the gain of the various amplifier stages associated with each of the input channels of the mixer 179 are so adjusted that there is developed across the plate load resistance 258 a voltage $e_{10}$ comprising the difference between the voltages $e_3$ and $e_9$, these voltages being defined by Equations 17, 24 and 25, supra.

It will be recalled in connection with the description of Fig. 8 that it was required that the voltages applied respectively to the grids of the tubes 249 and 250 be out of phase with each other so that the mixer stage formed by the tubes 249 and 250 and their associated circuits would effect a direct arithmetical subtraction of the two voltages. It is for this reason that the grid resistance 252 for the tube 250 is made adjustable and connected to ground through the condenser 253. By adjustment of the resistance 252, the phase of the voltage applied to the grid of the tube 250 may be adjusted to phase opposition relative to the voltage applied to the grid of the tube 249. The potentiometer 244 included in the grid circuit of the tube 249 permits a corresponding magnitude adjustment to be made.

The plates of the tubes 249 and 250 are coupled through a coupling condenser 259 to one input channel of the mixer stage 182 referred to, in connection with Fig. 8. This mixer stage includes vacuum tubes 260 and 261 which are interconnected in circuits similar to that described in connection with the tubes 249 and 250. The grid circuit for the tube 260 comprises the input channel just referred to while the grid circuit for the tube 261 comprises the second input channel of the mixer stage. This second channel is coupled through a coupling condenser 262 to one terminal of an output winding 263 of the rotary transformer 101, the other terminal of the winding 263 being connected to ground.

The input winding of the rotary transformer 101 has one terminal connected to ground and the other terminal connected to the conductor 219 which, it will be recalled, carries the regulated voltage E generated by the oscillator 167.

It will be recalled that the rotary transformer 101 is so arranged that the angle through which the rotor has been moved relative to the stator thereof is equal to the angle $\beta$. Thus the voltage $e_{11}$ which is applied to the grid of the tube 261 is equal to $E \sin \beta$, while the voltage which is applied to the grid of the tube 260 is equal to $E \sin \phi$. The tubes 260 and 261 are so arranged that the voltages $e_{10}$ and $e_{11}$ are subtracted with the result that the mixer output voltage $e_{12}$ represents the difference between $E \sin \phi$ and $E \sin \beta$. The output voltage $e_{12}$ is developed across a plate load resistance 267 which is connected between the interconnected plates of the tubes 260 and 261 and the source of plate potential.

In order that this subtraction may take place, it is necessary, of course, that the voltages applied to the grids of the respective tubes 260 and 261 bear a phase opposition relation to each other. This relation is obtained by proper adjustment of variable resistances 268 and 270 connected, respectively, into the grid circuit of the tube 261 and the cathode circuit of the tube 260, the two variable resistances being employed so that a magnitude balance as well as a phase balance may be obtained.

The plates of the tubes 260 and 261 are connected through a coupling condenser 275 to the grid of a vacuum tube 276 comprising the amplifier stage 183 referred to in connection with Fig. 8. The amplifier 183 may comprise any conventional amplifier construction and is illustrated in Fig. 9 as comprising a pentode type of vacuum tube amplifier. The amplifier 183 operates to develop across a plate load resistance 278 an amplified version of the voltage difference appearing across the load resistance 267 for the tubes 260 and 261.

This amplified voltage is applied to parallel connected grids of a pair of grid controlled rectifier tubes 282 and 283 comprising the phase selector 184 referred to in connection with Fig. 8. The coupling to the grids 282 and 283 is effected by means of a coupling condenser 284 and the grids of the tubes 282 and 283 are connected to ground through a grid resistance 284a. The cathodes of the tubes 282 and 283 are preferably interconnected and returned to ground through a resistance 285 and the suppressor grids of each of the tubes 282 and 283 are preferably interconnected and grounded as indicated at 286.

Power for operating the rectifiers 282 and 283 is preferably derived from the oscillator 167. Accordingly we connect a potentiometer 287 in parallel with the potentiometer 207 and connect the movable contact element of the potentiometer 287 to the grid of a power amplifying tube 288. The tube 288 may comprise any conventional power amplifier although a pentode type is illustrated in Fig. 9. The output voltage of the tube 288 is developed across a primary winding 291 of an output transformer 292.

The transformer 292 includes a pair of secondary windings 294 and 295. The outside terminals of each of the windings 294 and 295 are connected to the plates of the tubes 282 and 283. The inside terminals of the windings 294 and 295 are connected to ground through the actuating coils 296 and 297 of a pair of relays designated generally as relay A and relay B and hereinbefore referred to as the polarized relay 185. The coils 296 and 297 may be shunted by by-pass condensers 298 and 299.

It will be noted that the voltages which are applied, respectively, to the plates of the rectifiers 282 and 283 are in phase opposition to each other and that by virtue of the parallel connection of the grids of these tubes, the voltage which is applied to the grids will be in phase with each other. Thus if the voltage applied to the grids of the tubes is in phase with the plate voltage of the tube 282, the same will be rendered conductive and pass current through the cathode circuit including the resistance 285 and through the return circuit including the coil 297 of the relay B so as to effect an actuation of that relay.

When this condition obtains, the grid voltage of the tube 283 is in phase opposition to the plate voltage of the tube 283 so that the same will be blocked against operation and no current will flow in the plate-cathode circuit of the tube 283. As a result the coil 296 of the relay A will remain de-energized. If the phase of the voltage applied to the grids of the tubes 282 and 283 is caused to reverse, a reverse operation will take place; that is, the relay A will be operated, whereas the relay B will remain in its de-energized position.

It will be recalled that the voltage which is applied to the grids of the tubes 282 and 283 is proportional to the difference between the voltages $E \sin \phi$ and $E \sin \beta$. Thus three conditions may obtain:

(1) When $E \sin \phi$ exceeds $E \sin \beta$, the resultant voltage will be such that the grid of the tube 282 will have a voltage applied thereto which is in phase with the voltage applied to the plate of the tube 282, whereas the grid and plate voltages of the tube 283 will be in phase opposition to each other. This will result in the operation of relay B while relay A will remain in its de-energized position.

(2) When $E \sin \phi$ equals $E \sin \beta$, there will be no voltage applied to the grids of either of the tubes 282 or 283 with the result that the same will remain non-conductive and the relays A and B will both occupy their de-energized positions.

(3) When $E \sin \beta$ exceeds $E \sin \phi$, the voltage which is applied to the grids of the tubes 282 and 283 will be in phase with the voltage applied to the plate of the tube 283 and in phase opposition to the voltage applied to the plate of the tube 282 with the result that the tube 283 will be rendered conductive and relay A will be operated, whereas the tube 282 will remain non-conductive and relay B will remain in its de-energized position.

Thus relay B will operate whenever the angle $\beta$ is less than the angle $\phi$ or, otherwise stated, when the hand 133 must needs be moved further from its original or zero position. Similarly, relay A will be operated when angle $\beta$ exceeds angle $\phi$, or, otherwise stated, when the hand 133 must be moved back toward its zero position. Neither of the relays will be operated when the hand 133 occupies a position such that its angle of displacement is equal to the angle $\phi$ as computed by the calculator.

The relays A and B are employed to control the operation of the reversible motor 132. Accordingly a suitable source of power for operating the motor indicated in Fig. 9 as comprising a battery 300 has one terminal connected to ground and the other terminal connected to normally closed contacts 301A and 301B of the relays A and B, respectively. Normally open contacts 302A and 302B of the relays A and B, respectively, are connected to the interconnected cathodes of the tubes 282 and 283. The motor 132 is connected in series between the movable contact fingers of the relays A and B. Thus when the relays A and B both occupy their de-energized positions as is illustrated in Fig. 9, no voltage will be applied to the motor 132 and the same will not operate.

If the relay B is operated, a circuit for the motor 132 will be established from the battery 300 through the contacts 301A and 302B and the resistance 285 to ground resulting in rotation of the motor 132 in such direction as to increase the angular displacement of the hand 133. Similarly, if the relay A is operated, a circuit for the motor 132 will be established extending from the battery 300 through contacts 301B and 302A through the resistance 285 to ground, thus operating the motor 132 in the reverse direction to thereby reduce the angular displacement of the hand 133. When the hand 133 is rotated through an angle such that $\beta$ equals $\phi$, the relays A and B will both be de-energized and the motor 132 will stop.

Attention is directed to the fact that the cathode resistance 285 is also included in the circuit for the motor 132 and the current drawn by the motor 132 flows through this resistance in but one direction irrespective of the direction in which the motor is operated. It will also be noted that the negative terminal of the battery 300 is grounded so that current flows from the positive terminal of the battery 300 through the motor 132 and from thence to the resistance 285 to ground. The resulting potential drop through the resistance 285 applies a positive bias to the cathodes of the grid controlled rectifiers 282 and 283. The grids of these rectifiers are held at ground potential by their connection to ground through the grid resistance 284a.

Thus as $\beta$ approaches equality with $\phi$ and the voltage applied to the grids of the tubes 282 and 283 gradually reduces, a point is reached at which the voltage representing the difference between the angles $\beta$ and $\phi$ becomes equal to the positive bias applied to the cathodes of the tubes 282 and 283. When this condition obtains, the tube which has been previously in a conductive condition becomes non-conductive with the result that the corresponding relay returns to its de-energized position and the motor 132 is de-energized. Thus the motor 132 is de-energized before $\beta$ and $\phi$ are brought to precise equality. The ohmic value of the resistance 285 is so adjusted that this de-energization of the motor 132 does not occur until $\beta$ has so closely approached equality with $\phi$ that the coasting of the motor 132 following its de-energization will be sufficient to bring $\beta$ equal to $\phi$.

If this "anti-hunting" provision is not provided, the motor 132 will not be de-energized until $\beta$ is brought to equality with $\phi$ with the result that a slight amount of coasting by the motor 132 will increase the value of $\beta$ so that it will somewhat exceed the value of $\phi$. This would result in the energization of the motor in the opposite direction with the result that the motor would tend to "hunt" back and forth across the point at which $\beta$ precisely equalled $\phi$.

*The lead angle indication*

It will be seen from the foregoing description that the device just described coacts with the motor 132 so as to effect an automatic angular shifting of the hand 133 by an amount equal to the lead angle $\phi$ so that the position of the hand 133 relative to the dial 134 will directly indicate the magnitude of the lead angle $\phi$. The direction of measurement of the angles is so taken that the sign of the indicated value of $\phi$ directly indicates the direction in which the target ship TS must be led so that by angularly changing the course of the aircraft in the indicated direction, the pilot of the aircraft may pursue that course along which the torpedo must travel in order to intercept the target ship at the collision point O.

In order to effect the automatic and continuous calculation of the angle $\phi$ by means of the apparatus just described, it is only necessary for the pilot of the aircraft to maintain the device in operative condition and to set up, by means of knobs 3 through 7 upon the dials 3a—7a, the correct values of the factors H, V, U, $\theta$ and R which are involved in the calculation of the angle $\phi$. Attention is directed to the fact that the change of any one of these factors will instantly produce a corresponding change in the calculated value of angle $\phi$ and will result in immediate operation of the motor 132 to bring the pointer 133 to a corresponding position on the dial 10 so that a substantially instantaneous correction of the value of the angle $\phi$ as indicated by the indicating device 10 may be had by merely correcting the magnitude of the factors H, V, U, $\theta$ and R through proper manipulation of the knobs 3—7 as these factors are found to change. Thus by proper operation of the device, the indicating device 10 may be caused to continuously indicate the current value of $\phi$ even though the various factors going into the calculation of that angle may be subject to more or less continuous change.

From the preceding description of the apparatus which has been carried forward in connection with Figs. 8 and 9, it will be noted that different portions of the described apparatus may be arranged to perform different mathematical operations. For example, the rotary transformers 101 and 104 perform a multiplying operation of two quantities, either or both of which may be variable. For example, the rotary transformer 104 serves to effect a multiplication of the voltage E by the factor sin $\theta$. This latter factor is variable and the magnitude thereof may be varied by correspondingly adjusting the transformation ratio of the rotary transformer. By so constructing the rotary transformer that the transformation ratio is a trigonometrical function of the angle through which the rotor is displaced, it is possible to introduce into the mathematical operation the corresponding trigonometrical function. In the case of the transformers hereinbefore referred to, the trigonometrical function selected is a sine function so that through the use of these variable ratio transformers, it is possible to effect a multiplication of E by the sine of the variable angle $\theta$.

The apparatus described also embodies another method of obtaining the product of two variable quantities. For example, the potentiometer 170 and the amplifier stage 172 referred to in connection with Fig. 8 constitutes an application of this second principle. In this instance a variable alternating voltage $e_1$ is made equal to the first of the two variable quantities. This voltage is applied to the ends of the potentiometer 170 and the movable arm of the potentiometer 170 is turned to a position corresponding to the value of $(U/W)$, the second of the two variable quantities whose product is desired, and the voltage between the movable arm and one end of the potentiometer resistance strip is, therefore, proportional to $e_1$ $(U/W)$. By arranging the amplifier stage 172 to have a gain equal to the constant of proportionality of this proportion, the output voltage of the amplifier stage 172 may be made equal to the product of $e_1$ and $(U/W)$.

This same principle may be applied to obtaining the quotient between the variable quantities. This is illustrated by the potentiometer 177 and the amplifier stage 178. In this instance the dividend or first variable quantity comprises the input voltage $e_7$ while the quantity R represents the divisor or second variable quantity. The voltage $e_7$ is applied across the end terminals of a potentiometer and the movable arm of the potentiometer is moved to a point such that the voltage between the movable arm and one end of the potentiometer is proportional to $e_7$ $(1/R)$. By arranging the amplifier stage 178 to have a gain equal to the constant of proportionality of this proportion, the output voltage of the amplifier 178 may be made equal to the product of $e_7$ with $(1/R)$. This, of course, produces as an end result the division of $e_7$ by R.

The above described functions of our invention may also be viewed in the light that the potentiometers employed such as potentiometers 170 and 177 just referred to constitute a part of the associated amplifiers 172 and 178. When this view is taken, the potentiometers actually constitute gain or amplification controls for the amplifier stages so that it may be said in the one instance that the product of $e_1$ with $U/W$ is obtained by applying the voltage $e_1$ to the input of the amplifier and adjusting the gain of the amplifier to be equal to $U/W$ so that the output of the amplifier is equal to the product of $e_1$ with $U/W$.

Similarly, in the case of the operation of obtaining a quotient, it may be said that the voltage $e_7$ is applied to the input of an amplifier and the amplification of that amplifier is adjusted to be equal to $1/R$ so that the output of the amplifier is equal to the product of $e_7$ with $1/R$ or is equal to the quotient obtained by dividing $e_7$ by R.

The device of our invention also operates to effect an algebraic addition of two variable quantities. This is illustrated by the mixer stage 179 wherein the algebraic sum of two voltages applied to the input channels of the mixer stage 179 is obtained. In this connection it will be noted that the mixer always produces an algebraic addition of the two input voltages and that an arithmetical addition is obtained by adjusting the time phase of the voltages to be in phase with each other, while an arithmetical subtraction is obtained by adjusting the time phase of the input voltages to be in phase opposition to each other.

In this connection it is desired to point out that the mixer 179 as it is arranged in the calculating device of our invention performs an operation of the form $x(1 \pm y)$. This results from the fact that one of the input voltages to the mixer 179; namely, the voltage $e_3$, appears also as a factor in the other input voltage $e_9$ so that the mixer actually performs an operation of the form $x \pm xy$. By so arranging the circuits, it is possible to obtain the product of one variable quantity with the complement of a second variable quantity.

*Additional aspects of the torpedo course problem*

As was pointed out hereinbefore (see page 8 supra) the preceding analysis relating to the calculation of the torpedo course was based upon the assumption that the flight path of the aircraft along the line 13 before the veering 17 and along the line 18 after the veering defined straight lines. Under ordinary circumstances the real paths 13 and 18 followed by the aircraft are curved due to the simultaneous progress of the target ship TS and the aircraft 12 while the aircraft is being so piloted as to maintain the sighting line dead on the target ship. These curved paths are of the type commonly referred to as "homing paths" and since the aircraft velocity V is of the order of four or five times the velocity U of the target vessel, the curvature of the homing paths is so very slight that the curvature actually present has no significant influence on the geometry entering into the calculation of the lead angle $\phi$. Such path curvature as does occur, however, has the effect of slightly increasing the observed approach angle $\theta$ before the veering maneuver 17 and of slightly decreasing the observed approach angle $\theta$ after the veering 17 and during the time the aircraft is following the course 18.

Although in most instances the variation of the approach angle $\theta$ will be imperceptible, our invention permits the user thereof to take any perceptible change of this angle into account and permits an instantaneous adjustment to correct for the perceived change in the approach angle by readjusting the knob 6 in accordance with the observed changes in $\theta$. Such a readjustment will instantly correspondingly change the calculated value of the angle $\phi$ and will cause the electrical calculator of our invention to operate the motor 132 and readjust the angular position of the hand 133 to indicate the corrected value of $\phi$.

As an alternate procedure the curvature of the initial approach path 13 can be entirely avoided by making this part of the approaching on a straight air interception course which is so chosen that if the aircraft were to continue therealong, it would pass directly over the target vessel.

In this procedure the target does not appear dead ahead of the aircraft during the initial approach but at a constant air interception lead angle. All that it is necessary for the pilot to do is during the preliminary approach phase 13 to follow a course directed ahead of the target by such an amount that upon continued approach no course change of the aircraft is required to keep the sighting line on the target vessel when the sighting line is disposed at the air interception lead angle to the course of the aircraft. Experience has shown that no great accuracy of determination is required and that, in fact, a very rough estimate of the air interception lead angle will generally suffice to make the approach path straight for all practical purposes.

Calculation of range indication

In order that the released torpedo may collide with the target ship, it is necessary that the torpedo be released from the aircraft at the time the aircraft reaches a release point RP located in accordance with the chosen torpedo travel range. If the torpedo is released either sooner or later than at the point RP, the torpedo will in all probability pass, respectively, behind or in front of the target ship TS instead of colliding with the ship as is desired. It is accordingly necessary that some means be provided for apprising the pilot of the aircraft of his arrival at the chosen release point RP corresponding to his previously selected torpedo travel range R as set up on the potentiometer 177.

Referring again to Fig. 2, the length of the side 21 of the sighting triangle has been represented by the symbol Y and the apparent length of the target ship TS as viewed from the point RP is represented by the symbol L'. It will be noted that the distance Y may be expressed in terms of the apparent length L' of the target ship TS and the angle between two sighting lines 302 and 303 directed, respectively, from the release point RP to the bow and stern of the target ship TS. The angle between the lines 302 and 303 may be expressed in terms of the distance S subtended thereby at an arbitrarily chosen distance F from the release point RP. The distance S may be ascertained from the following equation $$S = L'F/Y \qquad (29)$$

Employing the symbol L to represent the actual length of the target ship TS, the apparent length L' may be defined as $$L' = L \sin \theta \qquad (30)$$

Also it may be stated from the law of sines that $$R/Y \sin \theta / \sin \alpha \qquad (31)$$

where $\alpha$ is the angle between the sides R and D of the sighting triangle. However, $$\sin \alpha = \sin (\phi + \theta) \qquad (32)$$

Substituting Equations 30 and 31 in Equation 29 gives $$S = \frac{FL \sin^2 \theta}{R \sin (\phi + \theta)} \qquad (33)$$

The device of our invention includes also apparatus arranged to calculate the value of S in terms of F, L, R, $\theta$ and $\phi$.

The electrical calculation of S

We have also illustrated by means of the block diagram of Fig. 8 the manner in which a voltage proportional to the distance S may be developed. For this calculator we employ as the source of the voltage the same alternating potential generator 167 as is employed in the calculation of $\phi$ as has been previously described. It will be recalled that the voltage E generated by the source 167 is conveyed to the rotary transformer 104 so that the output voltage thereof is $$e_1 = E \sin \theta \qquad (34)$$

The voltage $e_1$ is applied to the input winding of the immediately adjacent rotary transformer 103 so that the voltage output thereof will be $$e_{15} = e_1 \sin \theta \qquad (35)$$

or $$e_{15} = E \sin^2 \theta \qquad (36)$$

The voltage $e_{15}$ is fed to a potentiometer 321 which is connected to the same knob 7 as is used to operate the potentiometer 177 so that when the knob 7 is set to the selected range, both of the potentiometers 177 and 321 are set to the corresponding positions.

The dial 7a of the potentiometer 321 is calibrated in terms of R, the selected torpedo travel range and the calibration is so arranged that the voltage output of the potentiometer is $$e_{16} = e_{15}/RK_6 \qquad (37)$$

The voltage $e_{16}$ is fed to an amplifier stage 322, the overall gain of which may be adjusted to be equal to $K_5$ so that the voltage output of the amplifier 322 will be $$e_{17} = E \sin^2 \theta / R \qquad (38)$$

The voltage $e_{17}$ is applied to a potentiometer 323 to which the knob 8 is attached. The dial 8a of this potentiometer is calibrated in terms of L, the actual length of the target ship TS and this calibration is so arranged that the voltage output of the potentiometer 323 is $$e_{18} = e_{17}L/K_7 \qquad (39)$$

The voltage $e_{18}$ is fed to an amplifier stage 324, the overall gain of which is adjusted to be equal to $FK_6$. Thus the voltage output of the amplifier 324 is $$e_{19} = (EFL \sin^2 \theta)/R \qquad (40)$$

The voltage $e_{19}$ is fed as indicated at 325 to a normally high gain amplifier 326, the nominal gain of which may be referred to as $u$.

The output voltage $e_{20}$ of the amplifier stage 326 is applied by means of a feedback circuit 327—328 to the input of the amplifier 326. The feedback is arranged to be negative; that is, out of phase with the input voltage $e_{19}$ so as to, in effect, reduce the gain of the amplifier stage 326.

Within the feedback circuit 327—328 we include the rotary transformer 102 which is so coordinated with the rotary transformers 101 and 103 as to have a transformation ratio proportional to the sine of the sum of the angles $\beta$ and $\theta$.

The manner in which this coordination is effected is illustrated diagrammatically in Fig. 3. In this diagram the numeral 310 is used to represent the axis of rotation of the rotary transformers 101—104. The arrows bearing the reference characters 101R, 102R, 103R and 104R are used to, respectively, designate the rotors of the rotary transformers 101—104.

In a similar manner the reference characters 101S, 102S, 103S and 104S are used to designate the stators of the respective rotary transformers 101—104. It will be recalled that the stators 103S and 104S are fixed to the housing 1, this securing of the stators 103S and 104S being indicated at 330 and 331, respectively, in Figs. 3 and 4.

It will likewise be recalled that the rotor 101R of the transformer 101 is fixed to the housing 1 as by connecting the shaft 105 to the bracket 105a. This fixing of the rotor 101R is indicated at 332 in Figs. 3 and 4. The stators 101S and 102S of the rotary transformers 101 and 102 are secured to each other and to the worm wheel 106 so as to be revolved by the motor 132 through the angle $\beta$, this fixing of the stators 101S and 102S being indicated by the dashed line 333 in Figs. 3 and 4.

Similarly, the rotors 102R, 103R and 104R are each secured to each other and to the control knob 6 as by connecting the shaft 26 to each of these rotors. This interconnection of the rotors 102R—104R is indicated in Figs. 3 and 4 by the dashed line 334.

In Fig. 3 we have illustrated the knob 6 as having been revolved through an angle $\theta$. Since the stators 103S and 104S are fixed, this results in disposing the rotors 102R, 103R and 104R at an angle $\theta$ relative to the fixed stators. This angular relationship is diagrammatically illustrated in Fig. 3.

Similarly, in Fig. 3 we have illustrated the worm wheel 106 as having been revolved through an angle $\beta$. Since the rotor 101R is fixed and the stators 101S and 102S are interconnected, this rotation of the worm wheel results in angularly shifting the stators 101S and 102S through the angle $\beta$ relative to the rotor 101R.

Referring particularly to that portion of Fig. 3 illustrating the rotor and stator of the transformer 102, it will be noted that the stator 102S has been shifted in one direction by the angle $\beta$, whereas the rotor has been shifted in the opposite direction through the angle $\theta$. As a result the angular relation between the rotor 102R and the stator 102S comprises the sum of the angles $\beta$ and $\theta$. Thus the transformation ratio of the transformer 102 is made directly proportional to the sine of the sum of the angles $\beta$ and $\theta$.

The amplifier stage 326, together with the feedback circuit 327—328 constitutes a negative feedback amplifier. In such an amplifier the overall gain of the system may be expressed by $$G = u/(1+uk) \quad (41)$$

where $u$ is equal to the nominal gain of the amplifier stage and $k$ is equal to the feedback constant or ratio between the input to the feedback circuit and the output of the feedback circuit. For a high gain stage where $u$ is very large with respect to one, Equation 41, supra, may be written as $$G = 1/k \quad (42)$$

Likewise if $e_1$ represents the input voltage to the feedback amplifier and $e_0$ represents the output voltage of the feedback amplifier, it may be said that $$e_0 = e_1 G \quad (43)$$

Comparing Equations 42 and 43, we find that $$e_0 = e_1/k \quad (44)$$

Applying these general considerations to the feedback stage involving the amplifier 326 and the rotary transformer 102, it will be observed that the function $\sin(\beta+\theta)$ is the feedback constant and corresponds to $k$ of Equation 44 while the input voltage $e_{19}$ corresponds to $e_1$ and the output voltage $e_{20}$ corresponds to $e_0$. It may thus be seen that $$e_{20} = e_{19}/\sin(\beta+\theta) \quad (45)$$

or $$e_{20} = \frac{EFL \sin^2 \theta}{R \sin(\beta+\theta)} \quad (46)$$

Comparing this with Equation 33, supra, it will be noted that when $\beta$ equals $\phi$ as is the case when the motor 132 has operated to move the hand 133 through the angle $\beta$ corresponding to the calculated lead angle $\phi$ Equation 46 becomes identical with $$e_{20} = \frac{EFL \sin^2 \theta}{R \sin(\phi+\theta)} \quad (47)$$

Comparing Equation 47 with Equation 33, supra, will show that $$e_{20} = ES \quad (48)$$

Thus the output voltage $e_{20}$ is directly proportional to the calculated value of S. This proportional voltage is applied as indicated at 329 in Fig. 8 to the coil of an electrical voltmeter or galvanometer 306.

Preferably the circuit constants are so chosen as to produce a maximum galvanometer deflection by a change in the value of $(\beta+\theta)$ from $\pm 90°$ to $\pm 45°$ or $\pm 135°$. With the parts so adjusted, it will be apparent that unless provision is made for preventing the occurrence, an excessive voltage will be applied to the coil of the galvanometer 306 whenever the knob 6 and the worm wheel 106 are so positioned with respect to each other as to provide a value of $(\beta+\theta)$ less than $\pm 45°$ or greater than $\pm 135°$.

This occurrence is prevented by employing a gain limiting circuit which includes a rectifier 392, the input of which is coupled as at 393 to the output of the amplifier stage 326, and the output of which is connected as at 394 to control the gain of the amplifier stage 326 in such manner as to produce a reduction in gain as a result of an increase in the output potential of the rectifier 392.

The rectifier 392 is preferably so biased as to prevent any rectifying action from taking place until the alternating potential applied to the input thereof rises to a value equal to the voltage corresponding to maximum deflection of the galvanometer.

When the output voltage of the amplifier stage 326 rises to a value exceeding that corresponding to a maximum deflection of the galvanometer, the rectifier 392 will begin to rectify and the resulting direct potential is so applied to the amplifier stage 326 as to reduce the gain thereof and produce a corresponding reduction in voltage generated thereby. The rectifier 392 thus operates to prevent any appreciable rise in the voltage applied to the coil of the galvanometer 306 above that corresponding to a value of $(\beta+\theta)$ equaling $\pm 45°$ or $\pm 135°$ and thus serves to prevent injury to the coil of the galvanometer 306.

We have illustrated in the schematic wiring diagram Fig. 9 the electrical connections employed for performing the operations previously described in connection with Fig. 8. Attention is directed to the rotary transformer 104 and the output conductor 222 thereof shown in Fig. 9. It will be noted that we have connected a conductor 335 to the conductor 222 and that conductor 335 is extended into connection with the input winding 336 of the rotary transformer 103.

It will be recalled that the voltage developed on the conductor 222 equals $E \sin \theta$. This voltage is thus applied by the conductor 335 to the rotary transformer 103. It will be recalled that the transformation ratio of the transformer 103 is also proportional to $\sin \theta$ so that the voltage developed across the secondary winding 337 thereof corresponds to Equation 35, supra.

It may be found desirable to interpose a vacuum tube amplifier stage between the windings 221 and 336 to prevent the changing impedance of the winding 336 from adversely affecting the voltage developed across the winding 221.

One terminal of the output winding 337 is grounded and the other terminal is connected to ground through the resistance strip portion of the potentiometer 321. The arm portion of the potentiometer 321 is connected to the grid of an amplifier tube 338 comprising the amplifier stage 322 referred to in Fig. 8.

It will be recalled that the potentiometer 321 is calibrated in terms of R so that this factor is introduced into the voltage which is applied to the grid of the tube 338. The plate of the tube 338 is connected directly to the source of plate potential and the cathode of the tube 338 is connected to ground through a cathode bias resistance 339 and the resistance strip portion of the potentiometer 323, the potentiometer comprising the load resistance for the tube 338.

The grid of the tube 338 is connected to ground through a grid resistance 340 and a by-pass condenser 341 and the point of common connection between the resistance 340 and the condenser 341 is connected through a coupling resistance 342 to the point of common connection between the resistances 339 and the potentiometer 323. The movable arm of the potentiometer 323 is connected through a coupling condenser 343 to the grid of an amplifier tube 344 comprising the amplifier stage 324 referred to in Fig. 8.

It will be recalled that the potentiometer 323 is calibrated in terms of L so that this factor is introduced into the voltage which is applied to the grid of the tube 344. The tube 344 is connected in a circuit which is similar to that employed for the tube 338 and which includes in the cathode circuit a load resistance 346. The voltage developed across the load resistance 346 is conveyed through a coupling condenser 350 to the input circuit of the feedback amplifier 326 referred to in connection with Fig. 8.

The feedback amplifier 326 includes vacuum tubes 351, 358 and 364 connected in a conventional resistance coupled amplifier circuit, the voltage output thereof being applied to a primary winding 369 of an output transformer 370. The transformer 370 includes a secondary winding 371, the center tap of which is grounded as at 372 and the end terminals of which are connected as by means of a conductor 373 to the clips or fixed contact members 376 and 377 of a single pole-double throw switch indicated generally at 375. The blade or movable contact member 374 of the switch 375 is connected to one terminal of the input winding 380 of the rotary transformer 102, the other terminal being connected to ground as by means of the conductor 381.

The switch 375 is, as is shown in Fig. 5, mounted within the housing 1 and arranged to be actuated by turning movement of the knob 6 so as to move the switch blade 374 from the position illustrated in Fig. 9 engaging the fixed contacts 377 to the opposite position engaging the contact 376 when the knob 6 is turned from a point representing a positive value of the angle θ to a point representing a negative value of the angle θ, the amplifier being so arranged that this operation of the switch 375 occurs substantially simultaneously with the change in sign of the indicated value of the angle θ.

This may be readily accomplished by employing a toggle type switch for the switch 375 and arranging the operating lever thereof to be engaged by a cam member 375a secured to the shaft 26. By employing a toggle type of switch, the position of the switch lever relative to the cam member 375a may be so adjusted as to cause the switch to change positions with the change of the sign of the angle θ while at the same time providing for positive electrical contact in each of the two switch positions.

Reference to Fig. 2 will indicate that whenever the geometry is such that the sign of the angle β changes from plus to minus, the sign of the angle α undergoes an identical change simultaneously therewith. It therefore follows that the complementary angle $(\beta+\theta)$ likewise undergoes the same change of sign as does the angle θ and at the same time and that the position of the switch 375 conforms to the sign of the angle $(\beta+\theta)$. By this means the time phase of the voltage induced in the output winding 382 of the rotary transformer 102 is maintained independent of the sign of the angle $(\beta+\theta)$.

The secondary winding 382 has one terminal grounded and the other connected to ground through a variable resistance 383. The ungrounded terminal of the winding 382 is also connected through a coupling condenser 384 and a potentiometer 385 to the grid of a vacuum tube 386. The plate of the vacuum tube 386 is directly connected to the plate of the vacuum tube 351. Thus the output transformer 370, the rotary transformer 102, the potentiometer 385 and the vacuum tube 386 constitute a feedback connection serving to subtract from the voltage normally appearing in the output circuit of the tube 351 a modified version of the output voltage of the vacuum tube 364.

The respective voltages are so phased as to produce an arithmetical subtraction of these voltages with the result that the output voltage developed between the plate of the tube 364 and ground is modified as a function of sin $(\beta+\theta)$ and so conforms to Equation 45, supra.

It will be recalled in connection with the derivation of that equation that in order to obtain the precise division noted in Equation 45, it is necessary that the nominal gain $u$ of the amplifier be so large with respect to one that the expression $u/(1+uk)$ be, to all intents and purposes, equal to the expression $1/k$. Such a condition is difficult to obtain in practice and for this reason the variable resistance 383 is applied as a load across the output winding 382 of the rotary transformer 102. By proper adjustment of the resistance 383, advantage may be taken of the relatively poor voltage regulation at low values of $\theta+\beta$ of the winding 382 resulting from its high impedance in such manner as to compensate for the fact that $u/(1+uk)$ is not precisely equal to $1/k$.

It will be recalled that in connection with the derivation of Equation 44, supra, that the arithmetical division indicated by Equation 46 depends upon the device operating as a negative feedback amplifier. This requires that the sign of the function sin $(\beta+\theta)$ be the same for both positive and negative values of the angle $(\beta+\theta)$. This result is achieved by the use of the switch 375 above referred to. If this or an equivalent provision is not made the circuits just described will operate as a negative feedback circuit for values of $(\beta+\theta)$ having one sign, as for example positive values, and will operate as a positive feedback circuit or oscillator for values of $(\beta+\theta)$ having an opposite sign, for example negative values.

The voltage $e_{20}$ defined by Equation 46, supra, is the voltage applied to the galvanometer 306. Accordingly the plate of the tube 364 is connected through a coupling condenser 388 to one terminal of a rectifier 389. The other terminal of the rectifier 389 is connected through a multiplying resistance 390 to one terminal of the coil of the galvanometer 306, the other terminal of the coil being grounded as indicated at 391.

As before explained, we employ a gain limiting circuit including the rectifier 392 for preventing the application to the galvanometer 306 of an excessively high voltage. This gain limiting circuit is illustrated in detail in Fig. 9 in which the cathodes of the rectifier 392 are shown as coupled through a coupling condenser 393 to the plate of the tube 364. The plates of the rectifier 392 are connected to ground through the coupling resistance 355. The cathodes of the rectifier 392 are likewise connected through a coupling resistance 394 to the movable arm of a potentiometer 395 which is included in a series voltage divider circuit including a fixed resistance 396 extended between the source of plate potential and ground.

The connection of the cathodes of the rectifier 392 to the potentiometer 395 serves to place a positive bias on the cathodes of the rectifier 392 so as to prevent any rectifying action from taking place until the alternating potential applied to the cathodes through the coupling condenser 393 rises to a point where the peak value exceeds the value of the positive bias applied to the cathodes. This value is adjusted to be equal to the voltage corresponding to maximum deflection of the galvanometer.

When the output voltage of the tube 364 rises to a value exceeding that corresponding to maximum deflection of the galvanometer, the rectifier 392 will begin to rectify and the resulting direct current will flow through a coupling resistance 355 connected between the plates of the rectifier 392 and ground so as to make the plates of the rectifier 392 negative with respect to ground. This negative voltage is coupled through a coupling resistance 354 to a gain control bus 353 to which the grids of each of the tubes 351, 353, 364 and 386 are returned. This increases the bias on the enumerated vacuum tubes and so reduces their amplification with a corresponding reduction in voltage generated between the plate of the tube 364 and ground. The rectifier 392 and its associated circuits thus operate to prevent any appreciable rise in voltage between the plate of the tube 364 and ground above that corresponding to a value of $(\beta+\theta)$ equalling $\pm 45°$ or $\pm 135°$ and thus serves to prevent injury to the coil of the galvanometer 306.

Referring now to Figs. 9 and 10, it is desired to call attention to the fact that the apparatus illustrated therein operates to solve the equation which is determinative of the value of S by performing a number of separate mathematical operations such as multiplication, division and addition. The fundamental basis of most of these operations has been hereinbefore described in connection with Fig. 8, but it is desired at this point to point out that in connection with Fig. 9 we have disclosed an alternative way of obtaining the quotient representing the division of one variable quantity by another. This is obtained by the amplifier 326 and its associated feedback circuit wherein the output voltage $e_{19}$ represents the quotient obtained by dividing the input voltage $e_{18}$ by the feedback factor which is made equal to sin $(\beta+\theta)$.

This division is obtained by employing an amplifier with a normally high gain so that the gain of the negative feedback stage may be expressed as one over the feedback constant. When this arrangement is employed and the feedback constant is made equal to the divisor and the input voltage is made equal to the dividend, the output voltage is thereby made equal to the quotient obtained by dividing the input voltage by the feedback constant.

*The range indication*

As hereinbefore described, the voltage output of the tube 364 which is applied to the coil of the galvanometer 306 is directly proportional to the calculated value of S. The galvanometer 306 comprises the indicating device 9 referred to in connection with Fig. 1 and its dial is preferably so calibrated as to indicate directly the calculated value of S.

Figure 7:
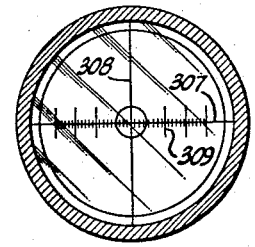
Fig. 7 illustrates a conventional reticule or field of view of a sighting device with which the results rendered by the calculating device of our invention are correlated.

It is anticipated that the calculating device will be used in connection with a sighting device of some character such as for example a telescope which is equipped with an eye-piece and cross-hairs or a suitably marked reticule. We have illustrated in Fig. 7 the general form and appearance of a type of reticule which may be employed. The reticule is ordinarily inscribed with horizontal and vertical cross-hair lines 307 and 308. The horizontal line 307 is normally intersected by a plurality of short vertical graduations 309, by means of which the apparent length of an object viewed through the sighting device may be measured.

It is intended that the calibration of the galvanometer 306 be so arranged with respect to F, the distance of the reticule from the eye-piece of the sighting device, as to indicate directly the number of graduations 309 which the apparent length L' of the target ship TS should measure when the aircraft has arrived at the release point RP.

Thus the pilot of the aircraft may, by having reference to the indicating device 9, ascertain the number of graduations 309 which the target ship TS should measure at the time the aircraft arrives at the release point RP and by then continuously observing the target ship TS as the release point RP is approached, the pilot will be apprised of the arrival at the release point RP by the enlargement of the image of the target ship TS as viewed through the sighting device until its apparent length L' as measured by the graduations 309 corresponds precisely to the indicated value of S given by the indicating device 9.

*Alternative circuit arrangement*

We have illustrated in Fig. 10 by means of a block diagram an alternative circuit arrangement which finds particular utility in certain applications as, for example, when the calculating device of our invention is to be built and incorporated as an integral part of an automatic sighting device for use on aircraft to assist in the proper sighting and launching of torpedoes. Such an adaptation of the calculating device of our invention is illustrated in our copending application Serial No. 472,168, filed January 12, 1943, and entitled "Sighting device." In such an adaptation of the calculating device, it is desirable, for convenience in making the electrical interconnections between various parts of the apparatus, to have a part of the apparatus associated with and mounted upon a certain part of the sighting device with other parts of the apparatus associated with and mounted upon other parts of the sighting and range finding equipment.

The circuit which is illustrated in Fig. 10 is identical in theory and mode of operation with the circuits which have been previously described and in Fig. 10 the same reference characters and same nomenclature has been used in identifying the various pieces of apparatus as has been previously used and described in connection with Fig. 8.

Fig. 11 illustrates the manner in which the various mechanisms included in the circuit arrangement of Fig. 10 may be associated with different parts of the apparatus. For example, the parts which are enclosed by the dashed lines identified by the reference character 400 may be mounted upon and coact with the sighting mechanism of a torpedo director of the character described in the aforementioned copending application. The equipment which is enclosed by the dashed line rectangle bearing the reference character 401 may be associated with a manual control or pre-setting device which may be used in conjunction with the sighting mechanism and used cooperatively with the remainder of the equipment which is enclosed by the dashed line 402 to control the operation of the various mechanism associated with the sighting device represented by the dashed line 400. The dashed line 402 may comprise a central amplifier rack or panel which may be mounted at any desired location in the aircraft.

Fig. 12 represents the complete schematic wiring of the component parts which go to make up the circuits which are illustrated in Figs. 10 and 11. In Fig. 12 the principal parts and the controlling elements have been identified by the same reference characters as have been applied to like parts in Figs. 8 and 9.

Summary

From the foregoing it will be seen that the pilot of an aircraft or other person employing the calculating device of our invention may, by setting the knobs 3—8 to positions on their associated dials 3a—8a representing the magnitude of the factors H, V, U, $\theta$, R and L, cause indications to be produced by the indicating devices 9 and 10 which comprise the two essential elements which must be known to the pilot of an aircraft in order that he may so launch a torpedo as to cause it to strike the selected moving target, these two essential elements comprising the angular amount by which the target must be led and an indication which will apprise him of the fact of arrival at the proper torpedo release point.

As has been pointed out hereinbefore, the calculator operates in a substantially instantaneous manner so that the magnitude of the indications given by the devices 9 and 10 may continuously correspond to the magnitude of the factors governing those indications even though those magnitudes may be subject to periodic or continuous change.

From the foregoing it will be observed that we have provided apparatus for performing certain mathematical functions such as the solution of algebraic or trigonometrical equations and that the method and apparatus of our invention achieves the desired result by electrical means.

While we have illustrated and described the apparatus of our invention as being embodied in a calculator designed particularly to solve the problems attendant upon the process of torpedoing a target ship, we have in so doing disclosed the manner in which certain specific mathematical operations may be performed electrically and it is therefore within the scope of this invention to apply the principles disclosed herein to the solution of algebraic or trigonometrical problems and equations even though such equations may be of a somewhat different form than the two equations which have been selected as illustrative examples for the purpose of this description.

While we have shown and described the preferred embodiment of our invention, we do not desire to be limited to any of the details of construction shown or described herein, except as defined in the appended claims.

We claim:

1. In an electrical computer for functions involving the relationships between the sides of a triangle, an apparatus for reproducing the relationships expressed by the law of sines, said apparatus comprising two variable transformers each having stator and rotor windings rotatable with respect to each other for varying the transformation ratio in proportion to the sine of the angle of said relative rotation, means mounting the stators and rotors of both transformers coaxially, means for adjusting the stator of one transformer with respect to the stator of the other transformer at an angle equal to one angle of said triangle, means connecting the rotors of said transformers, means for moving said rotors together to an angle equal to a second angle of said triangle, means for applying an alternating potential to the stators of said transformers, and means for measuring the ratio of the rotor potential of one transformer with respect to the rotor potential of the other transformer, said measured ratio being proportional to the sine of the sum of said first and second angles and by virtue of the law of sines equal to the ratio of the side of said triangle opposite the third angle thereof to the side opposite said second angle.

2. An apparatus for evaluating $$f(x, y) = x(1+y)$$

where $x$ and $y$ represent two variable quantities, comprising a source of alternating potential; means for adjusting said source to produce a potential, the magnitude of which as measured in terms of predetermined units of measurement is equal to $x$; a mixer stage including a pair of thermionic vacuum tubes having a first and a second input circuit and a common output circuit; means connecting said first input circuit to said source; an alternating potential amplifier having input and output circuits; means connecting said amplifier input circuit to said source; means for adjusting the amplification of said amplifier from input circuit to output circuit to be equal to $y$; means connecting said amplifier output circuit to said second input circuit; and measuring means connected to said common output circuit of said mixer stage for measuring the potential therein in terms of said predetermined units of measurement.

3. An apparatus for evaluating $$f(x, y, p, q, r, \theta) = xy\left(\frac{1-pq}{r}\right)\sin v$$

where $x$, $y$, $p$, $q$, and $r$ represent variable linear quantities and $\theta$ represents a variable angular quantity, comprising a source of alternating potential; means for adjusting said source to produce a potential, the magnitude of which as measured in terms of predetermined units of measurement is equal to $x$; an alternating current transformer having a secondary winding rotatable with respect to said primary winding and arranged to vary the transformation ratio of said transformer in accordance with the sine of the relative angular movement of said primary and secondary windings; means for adjusting the angular positions of said windings to be equal to $\theta$; means connecting said primary winding to said source; an alternating potential amplifier having input and output circuits; means connecting said input circuit to said secondary winding; means for adjusting the amplification of said amplifier from input to output to be equal to $y$; another alternating potential amplifier having input and output circuits; means connecting the input circuit of said other amplifier to the output circuit of said first-named amplifier; means for adjusting the amplification of said other amplifier from input to output to be equal to $p$; a third alternating potential amplifier having input and output circuits; means connecting the input circuit of said third amplifier to the output circuit of said other amplifier; means for adjusting the amplification of said third amplifier from input to output to be equal to $q$; a fourth alternating potential amplifier having input and output circuits; means connecting the input circuit of said fourth amplifier to the output circuit of said third amplifier; means for adjusting the amplification of said fourth amplifier from input to output to be equal to the reciprocal of $r$; an alternating potential mixer stage having separate input circuits and a common output circuit; means connecting one of said mixer input circuits to the output circuit of said fourth amplifier; means connecting the other input circuit of said mixer to the output circuit of said first-named amplifier; and measuring means connected to the common output circuit of said mixer for measuring the potential therein in terms of said predetermined units of measurement.

4. An apparatus for evaluating $$f(x, y, z, \theta, \alpha) = (xy \sin^2 \theta)/(z \sin \alpha)$$

where $x$, $y$, and $z$ represent variable linear quantities and where $\theta$ and $\alpha$ represent two variable angular quantities, comprising a source of alternating electrical potential; means for adjusting said source to produce a potential, the magnitude of which as measured in terms of predetermined units of measurement is equal to $x$; a pair of chain connected alternating current transformers each having a secondary winding rotatable with respect to a primary winding and so arranged as to vary the transformation ratio of said transformers in accordance with the sine of the angular positions of said primary and secondary windings with respect to each other; means connecting said transformers to said source; means for moving each of said secondary windings to a position representative of $\theta$; an alternating potential amplifier having an input and an output circuit; means connecting said input circuit to the output of said chain connected transformers; means for adjusting the amplification of said amplifier from input to output to be equal to $y$; a second alternating potential amplifier having an input and an output circuit; means connecting the input circuit of said amplifier to the output of said first amplifier; means for adjusting the amplification of said second amplifier from input to output to be representative of the reciprocal of $z$; a negative feedback alternating potential amplifier including an input circuit, an output circuit and a feedback circuit; means connecting the input circuit of said feedback amplifier to the output circuit of said second amplifier; a third alternating current transformer having a secondary winding rotatable with respect to said primary winding and arranged to vary the transformation ratio of said transformer in accordance with the sine of the angular movement of said primary and secondary windings relative to each other; means for moving said secondary winding of said third transformer to a position representative of $\alpha$; means connecting the primary winding of said third transformer to the output circuit of said feedback amplifier; means connecting the secondary winding of said third transformer to said feedback circuit of said feedback amplifier; and measuring means connected to the output circuit of said feedback amplifier for measuring the potential therein in terms of said predetermined units of measurement.

5. In an electrical computer for functions involving the relationships between the sides of a triangle, an apparatus for reproducing the relationships expressed by the law of sines, said apparatus comprising two variable transformers each having stator and rotor windings rotatable with respect to each other for varying the transformation ratio in proportion to the sine of the angle of said relative rotation, means for adjusting the stator of one transformer with respect to the stator of the other transformer at an angle equal to one angle of said triangle, means drivably interconnecting the rotors of said transformers, means for moving said rotors together to an angle equal to a second angle of said triangle, means for applying an alternating potential to the stators of said transformers, and means for measuring the ratio of the rotor potential of one transformer with respect to the rotor potential of the other transformer, said measured ratio being proportional to the sine of the sum of said first and second angles and by virtue of the law of sines equal to the ratio of the side of said triangle opposite the third angle thereof to the side opposite said second angle.

WOLFGANG B. KLEMPERER.
EVERETT H. PIER.

REFERENCES CITED

The following references are of record in the file of this patent:

UNITED STATES PATENTS

| Number | Name | Date |
|---|---|---|
| 889,989 | Thompson | June 9, 1908 |
| 1,506,936 | Lea | Sept. 2, 1924 |
| 2,319,106 | Blackburn | May 11, 1943 |
| 1,559,325 | Jewett | Oct. 27, 1925 |
| 1,869,209 | Mead | July 26, 1932 |
| 2,080,186 | Reymond | May 11, 1937 |
| 2,277,285 | Woodling | Mar. 24, 1942 |
| 2,306,456 | Mayne | Dec. 29, 1942 |
| 2,244,369 | Martin | June 3, 1941 |
| 2,401,527 | Vance | June 4, 1946 |
| 2,401,779 | Swartzel | June 11, 1946 |

OTHER REFERENCES

The M. I. T. Network Analyzer, M. I. T. publication #66, Jan. 1930.

RCA Receiving Tube Manual, copyright 1940.
Review of Scientific Instruments, Feb. 1940.
Mechanix Illustrated, Sept. 1942, pp. 116 and 153.

Herr and Graham, An Electrical Algebraic Equation Solver, Review of Scientific Instruments, Oct. 1938.